US012699762B2

(12) United States Patent
Liu et al.

(10) Patent No.: US 12,699,762 B2
(45) Date of Patent: Aug. 4, 2026

(54) DATA PROCESSING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Qinghong Liu, Shenzhen (CN); Fu Gao, Shenzhen (CN); Feng Lin, Shenzhen (CN); Xiaoqian Huang, Shenzhen (CN); Muyan Yang, Shenzhen (CN); Tony Tang, Shenzhen (CN); Jing Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 89 days.

(21) Appl. No.: 18/940,415

(22) Filed: Nov. 7, 2024

(65) Prior Publication Data

US 2025/0068716 A1 Feb. 27, 2025

Related U.S. Application Data

(63) Continuation of application No. PCT/CN2023/091031, filed on Apr. 27, 2023.

(30) Foreign Application Priority Data

Nov. 4, 2022 (CN) .......................... 202211378031.1

(51) Int. Cl.
*G06F 21/00* (2013.01)
*G06F 21/44* (2013.01)
*G06F 3/0482* (2013.01)

(52) U.S. Cl.
CPC ............ *G06F 21/44* (2013.01); *G06F 3/0482* (2013.01)

(58) Field of Classification Search
CPC ...... G06F 21/44; G06F 3/0482; G06F 40/103; G06F 3/04817; G06F 21/6209; G06F 3/0481; G06F 21/6245; G06F 2221/2141
See application file for complete search history.

(56) References Cited

U.S. PATENT DOCUMENTS 7,137,100 B2 * 11/2006 Iborra ....................... G06F 8/30
717/109
8,156,566 B2 * 4/2012 Lim ....................... H04L 63/104
726/1

(Continued)

FOREIGN PATENT DOCUMENTS

CN 103996008 A 8/2014
CN 109740360 A 5/2019

(Continued)

OTHER PUBLICATIONS

The World Intellectual Property Organization (WIPO) International Search Report for PCT/CN2023/091031 Jul. 10, 2023 7 Pages (including translation).

(Continued)

*Primary Examiner* — Mahfuzur Rahman
(74) *Attorney, Agent, or Firm* — Anova Law Group, PLLC

(57) ABSTRACT

A data processing method includes: displaying a document source control in a target application; displaying a to-be-authorized-document list in response to a trigger operation on the document source control, the to-be-authorized-document list including one or more document titles, the one or more document titles including a title that is in a document application and that corresponds to document data associated with a first object, and the first object being logged in (Continued)

to the document application through the target application; and displaying a first authorized-document list including a first title in response to a trigger operation on the to-be-authorized-document list (S103), the first title being a triggered document title, and the target application having a permission to perform service processing on document data corresponding to the first title.

18 Claims, 17 Drawing Sheets

(56) References Cited

U.S. PATENT DOCUMENTS

| | | | | |
|---|---|---|---|---|
| 8,185,548 | B2 * | 5/2012 | Lim | G06F 21/6227 |
| | | | | 709/200 |
| 9,020,912 | B1 * | 4/2015 | Majee | H04L 41/0233 |
| | | | | 707/693 |
| 9,268,958 | B1 | 2/2016 | Kessler | |
| 11,169,823 | B2 * | 11/2021 | Alabes | G06F 9/4451 |
| 2009/0313236 | A1 * | 12/2009 | Hernacki | G06F 16/24578 |
| | | | | 707/999.005 |
| 2012/0030182 | A1 * | 2/2012 | Claman | G11B 27/034 |
| | | | | 707/690 |
| 2014/0143830 | A1 * | 5/2014 | Lim | G06F 21/6218 |
| | | | | 726/1 |
| 2016/0283473 | A1 * | 9/2016 | Heinze | G06F 16/22 |
| 2016/0352523 | A1 * | 12/2016 | Bisbee | H04L 9/3263 |
| 2022/0366061 | A1 * | 11/2022 | Spivack | H04L 9/3271 |
| 2023/0078667 | A1 | 3/2023 | Lin et al. | |
| 2023/0274287 | A1 * | 8/2023 | Blaikie, III | H04L 9/3239 |
| | | | | 705/50 |
| 2023/0342166 | A1 * | 10/2023 | DeNeui | G06F 9/451 |
| 2025/0068716 | A1 * | 2/2025 | Liu | G06F 21/44 |

FOREIGN PATENT DOCUMENTS

| | | | |
|---|---|---|---|
| CN | 111555893 | A | 8/2020 |
| CN | 114692195 | A | 7/2022 |
| JP | 2004280321 | A | 10/2004 |
| WO | 2022143174 | A1 | 7/2022 |

OTHER PUBLICATIONS

Hardt, Dick. "The OAuth 2.0 Authorization Framework." Internet Engineering Task Force (IETF) RFC 6749 (2012).
OAuth 2.0, https://oauth.net/2/.
Open Licensing. (Mar. 17, 2024). Retrieved from Wikipedia:—{R|https://zh.wikipedia.org/w/index.php?title=%E5%BC%80%E6%94%BE%E6%8E%88%E6%9D%83&oldid=81926473}.

* cited by examiner

DATA PROCESSING METHOD AND APPARATUS, DEVICE, AND STORAGE MEDIUM

CROSS-REFERENCES TO RELATED APPLICATIONS

This application is a continuation application of PCT Patent Application No. PCT/CN2023/091031, filed on Apr. 27, 2023, which claims priority to Chinese Patent Application No. 202211378031.1, entitled "DATA PROCESSING METHOD AND APPARATUS, DEVICE, AND READABLE STORAGE MEDIUM" filed with the China National Intellectual Property Administration on Nov. 4, 2022, all of which are incorporated herein by reference in their entirety.

FIELD OF THE TECHNOLOGY

The present disclosure relates to the field of computer technologies, and in particular, to data processing.

BACKGROUND OF THE DISCLOSURE

As some open protocols (such as the OAuth protocol) for applications are used, when a target application is authorized by a user, the target application is allowed to access, through a functional interface provided by a document application, private document data (such as a photo, a video, and a contact list) stored by the user in the document application, and to invoke a document function provided by the document application.

Currently, when a user requests authorization on document data in a document application through a target application (usually during first installation or use), the document application grants permissions on all document data to the target application at a time, and the target application may subsequently access all the document data of the current user at any time. Clearly, not all the document data is to be used by the user in the target application, and the document data includes some private document data. When a server corresponding to the target application is attacked, the private document data of the user is likely to be leaked.

SUMMARY

Embodiments of the present disclosure provide a data processing method and apparatus, a device, a storage medium, and a program product, to improve security of document data in a document application when the document application is invoked by a third-party application.

An aspect of embodiments of the present disclosure provides a data processing method, including: displaying a document source control in a target application; displaying a to-be-authorized-document list in response to a display trigger operation on the document source control, the to-be-authorized-document list including one or more document titles, the one or more document titles including a title that is in a document application and that corresponds to document data associated with a first object, and the first object being an object that has logged in to the document application through the target application; and displaying a first authorized-document list including a first title in response to an authorization trigger operation on the first title in the to-be-authorized-document list, the authorization trigger operation granting the target application a permission to perform service processing on document data corresponding to the first title.

An aspect of embodiments of the present disclosure provides a data processing apparatus, including: a first display module, configured to display a document source control in a target application; a second display module, configured to display a to-be-authorized-document list in response to a display trigger operation on the document source control, the to-be-authorized-document list including one or more document titles, the one or more document titles including a title that is in a document application and that corresponds to document data associated with a first object, and the first object being an object that has logged in to the document application through the target application; and a third display module, configured to display a first authorized-document list including a first title in response to an authorization trigger operation on the first title in the to-be-authorized-document list, the first title being a document title that is in the to-be-authorized-document list and that is triggered by the authorization trigger operation, and the authorization trigger operation granting the target application a permission to perform service processing on document data corresponding to the first title.

An aspect of embodiments of the present disclosure provides a computer device, including a processor, a memory, and a network interface.

The processor is connected to the memory and the network interface. The network interface is configured to provide a data communication network element. The memory is configured to store computer code. The processor is configured to invoke the computer program to perform the method in embodiments of the present disclosure.

An aspect of embodiments of the present disclosure provides a non-transitory computer-readable storage medium. The computer-readable storage medium stores a computer program. The computer program is adapted to be loaded and executed by a processor to perform the method in embodiments of the present disclosure.

In embodiments of the present disclosure, a document source control associated with a document application may be displayed in a target application, and a to-be-authorized-document list may be displayed in response to a display trigger operation on the document source control, the to-be-authorized-document list including one or more document titles, the one or more document titles being a title that is in the document application and that corresponds to document data associated with a first object, and the first object being an object that has logged in to the document application through the target application; and then a first authorized-document list including a first title is displayed in response to an authorization trigger operation on the first title in the to-be-authorized-document list, the first title being a document title that is in the to-be-authorized-document list and that is triggered by the authorization trigger operation, and the target application having a permission to perform service processing on document data corresponding to the first title. In the method provided in embodiments of the present disclosure, when the first object needs to access document data in the document application while using the target application, the first object may autonomously select document data to be authorized to the target application, and the target application can have a permission to perform service processing only on the authorized document data. Therefore, other unauthorized document data is not exposed to the target application. This protects data privacy of the first object to the maximum extent, and improves security of the document data in the document application.

DESCRIPTION OF EMBODIMENTS

The technical solutions in embodiments of the present disclosure are clearly and completely described in the following with reference to the accompanying drawings in the embodiments of the present disclosure. It is clear that the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
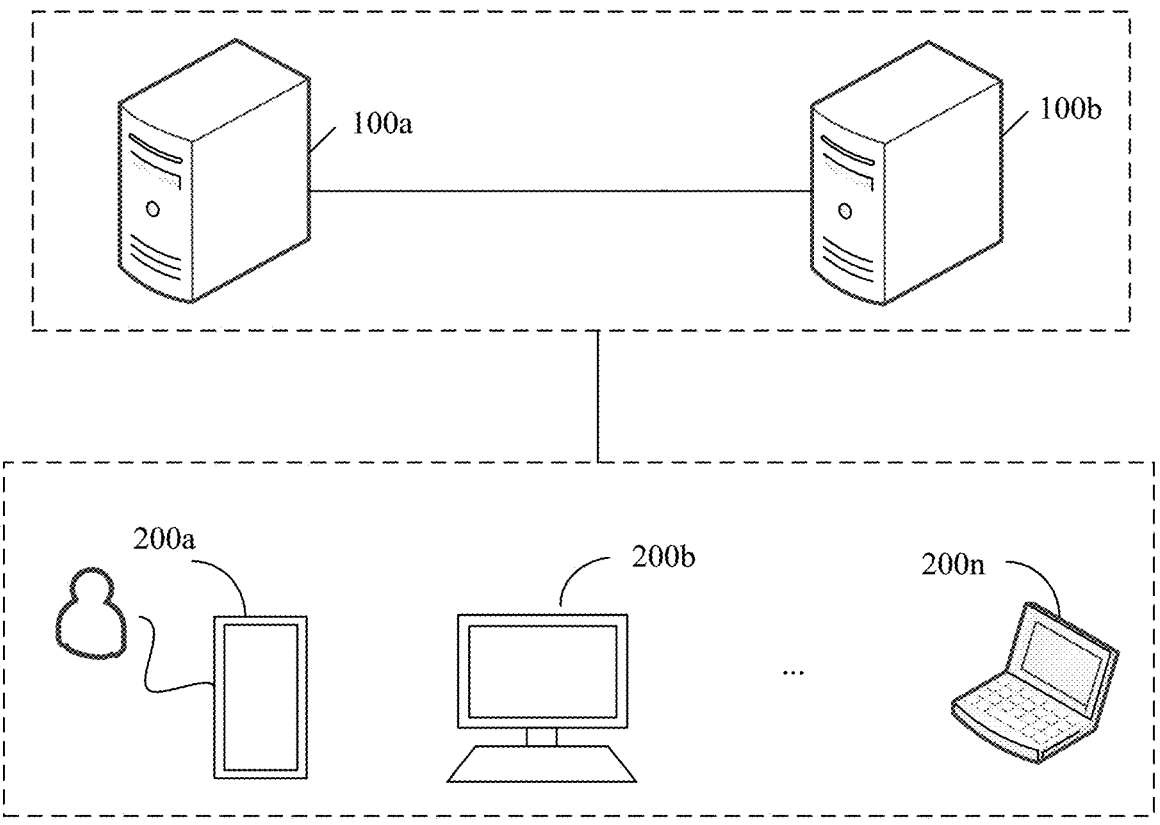
FIG. 1 is a schematic diagram of a system architecture according to an embodiment of the present disclosure.

FIG. 1 is a schematic diagram of a system architecture according to an embodiment of the present disclosure. The system architecture may include a target application server 100*a*, a document application server 100*b*, and a terminal cluster. The terminal cluster may include a terminal device 200*a*, a terminal device 200*b*, . . . , and a terminal device 200*n*. Any terminal device in the terminal cluster may have a communication connection to the target application server 100*a*. For example, the terminal device 200*a* has a communication connection to the target application server 100*a*. Any terminal device in the terminal cluster may have a communication connection to the document application server 100*b*. For example, the terminal device 200*b* has a communication connection to the document application server 100*b*. The target application server 100*a* may have a communication connection to the document application server 100*b*. A connection mode of the communication connection is not limited. A direct or indirect connection may be established through wired communication or wireless communication or in another manner. This is not limited in the present disclosure.

A target application client corresponding to a target application may be installed on each terminal device in the terminal cluster shown in FIG. 1. When running on each terminal device, the target application client may exchange data with the target application server 100*b* or the document application server 100*b* shown in FIG. 1. In this way, the terminal device can authorize document data in a document application when using the target application client, so that the target application client performs service processing on the authorized document data. The target application client may be an application client with a data processing function, for example, an instant messaging application, a livestreaming application, a short video application, video application, a music application, a social application, a shopping application, a game application, a novel application, a payment application, a print application, or a browser. The target application client may be an independent client or an embedded subclient integrated in a client (for example, an instant messaging application, a social client, or a video client). This is not limited herein.

For ease of understanding, the terminal device 200*a* is used as an example. The terminal device 200*a* may display a document source control through the target application. When some document data in the document application needs to be used in the target application, the document source control may be triggered. The terminal device 200*a* displays a to-be-authorized-document list in response to the trigger operation on the document source control. The to-be-authorized-document list includes one or more document titles. The one or more document titles are a title that is in the document application and that corresponds to document data associated with a first object. The first object is an object that has logged in to the document application through the target application. The one or more document titles may be obtained by the terminal device 200*a* from the document application server 100*b* in real time. Then the terminal device 200*a* may display a first authorized-document list including a first title in response to a trigger operation on the to-be-authorized-document list. The first title is a triggered document title. The target application has a permission to perform service processing on document data corresponding to the first title. Before displaying the first authorized-document list, the terminal device 200*a*, the target application server 100*a*, and the document application server 100*b* need to exchange data to jointly complete a process of authorizing the document data corresponding to the first title. The terminal device 200*a* displays the first authorized-document list including the first title only when determining that the target application has a permission to perform service processing on the document data corresponding to the first title. In addition, the target application has no permission to perform service processing on document data corresponding to an unauthorized-document title. This protects data privacy of the first object to the maximum extent, and improves security of document data in the document application.

A method provided in embodiments of the present disclosure may be performed by a computer device. The computer device includes but is not limited to a terminal device or a server (including the target application server or the document application server). The server may be an independent physical server, or may be a server cluster or a distributed system that includes a plurality of physical servers, or may be a cloud server that provides basic cloud computing services such as a cloud database, a cloud service, cloud computing, a cloud function, cloud storage, a network service, cloud communication, a middleware service, a domain name service, a security service, a CDN, big data, and an artificial intelligence platform. The terminal device may be a smart terminal on which an instant messaging application or a social application can be run, for example, a smartphone, a tablet computer, a notebook computer, a desktop computer, a palmtop computer, a mobile Internet device (MID), a wearable device (for example, a smart watch or a smart wristband), a smart television, or a smart in-vehicle device. The terminal device and the server may be directly or indirectly connected in a wired or wireless manner. This is not limited in embodiments of the present disclosure.

Embodiments of the present disclosure may be applied to various scenarios, including but not limited to cloud technologies, artificial intelligence, intelligent traffic, aided driving, and the like.

Related data such as document data is involved in specific implementations of the present disclosure. When the foregoing embodiments of the present disclosure are applied to a specific product or technology, user permission or consent is required, and collection, use, and processing of related data need to comply with related laws, regulations, and standards in related countries and regions.

Details are described below by using the following example: When running an application client of a print application, a terminal device authorizes document data in a document application through a print application server 20a and a document application server 20b, and then prints the authorized document data.

Figure 2A:
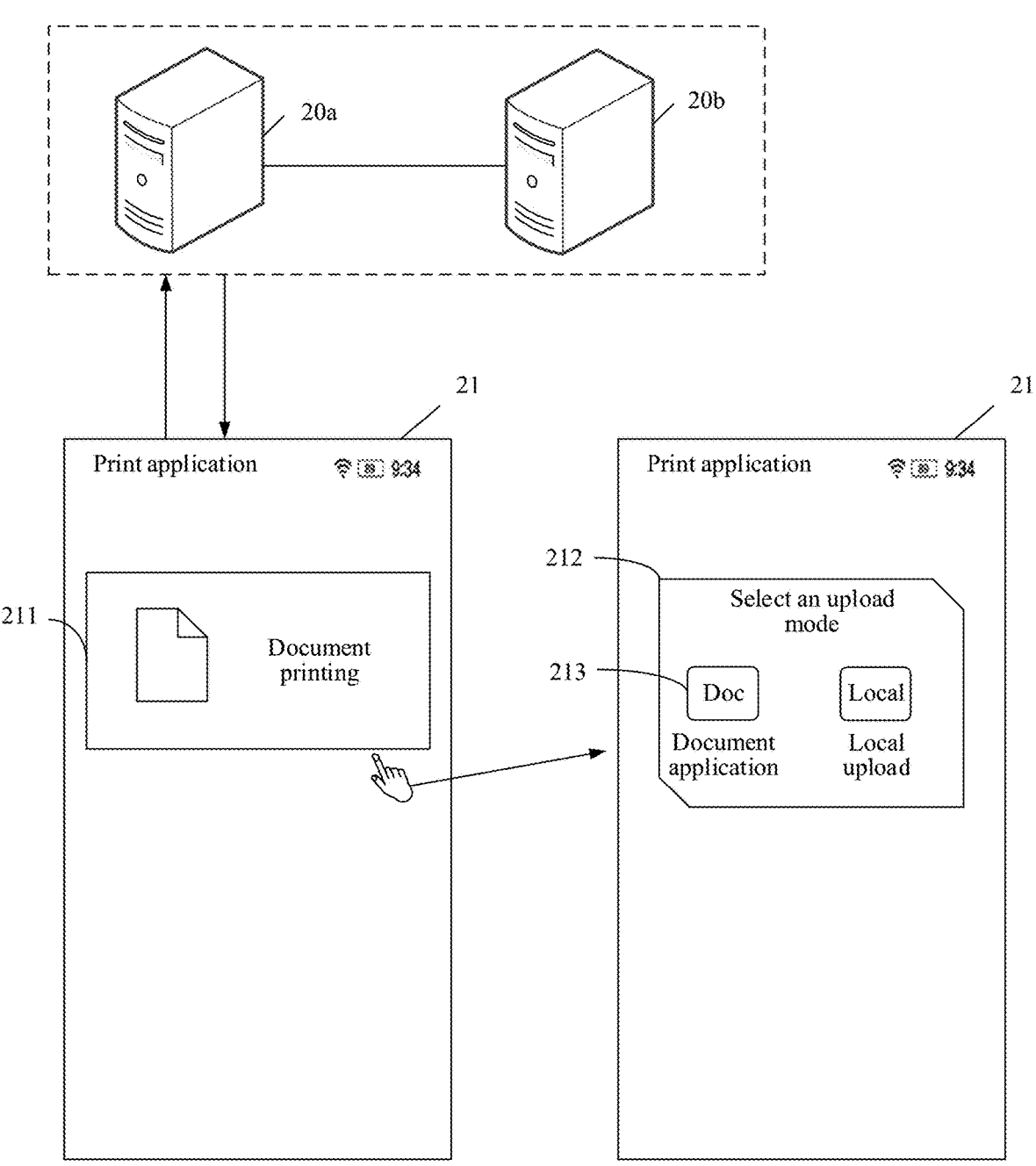
FIG. 2*a* is a schematic diagram of a scenario of document source selection according to an embodiment of the present disclosure.
Figure 2B:
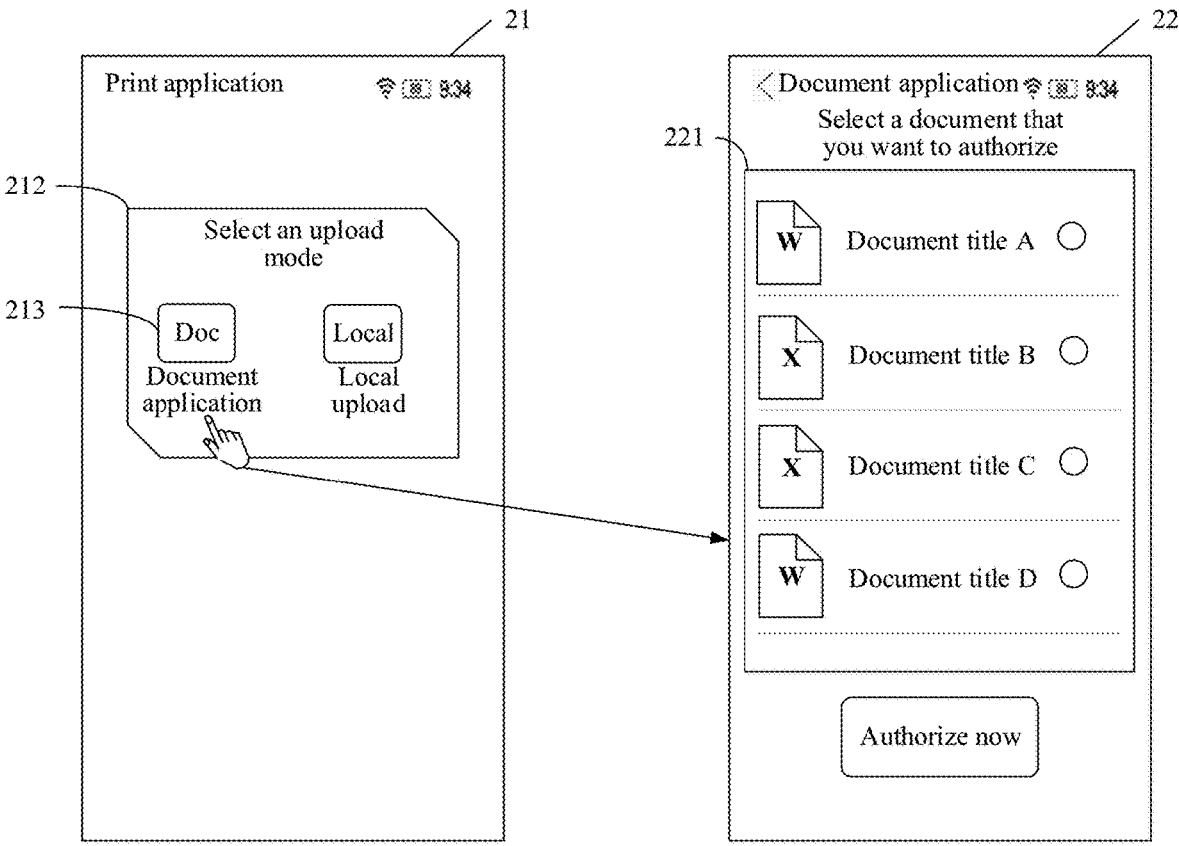
FIG. 2*b* is a schematic diagram of a scenario of authorization selection according to an embodiment of the present disclosure.
Figure 2C:
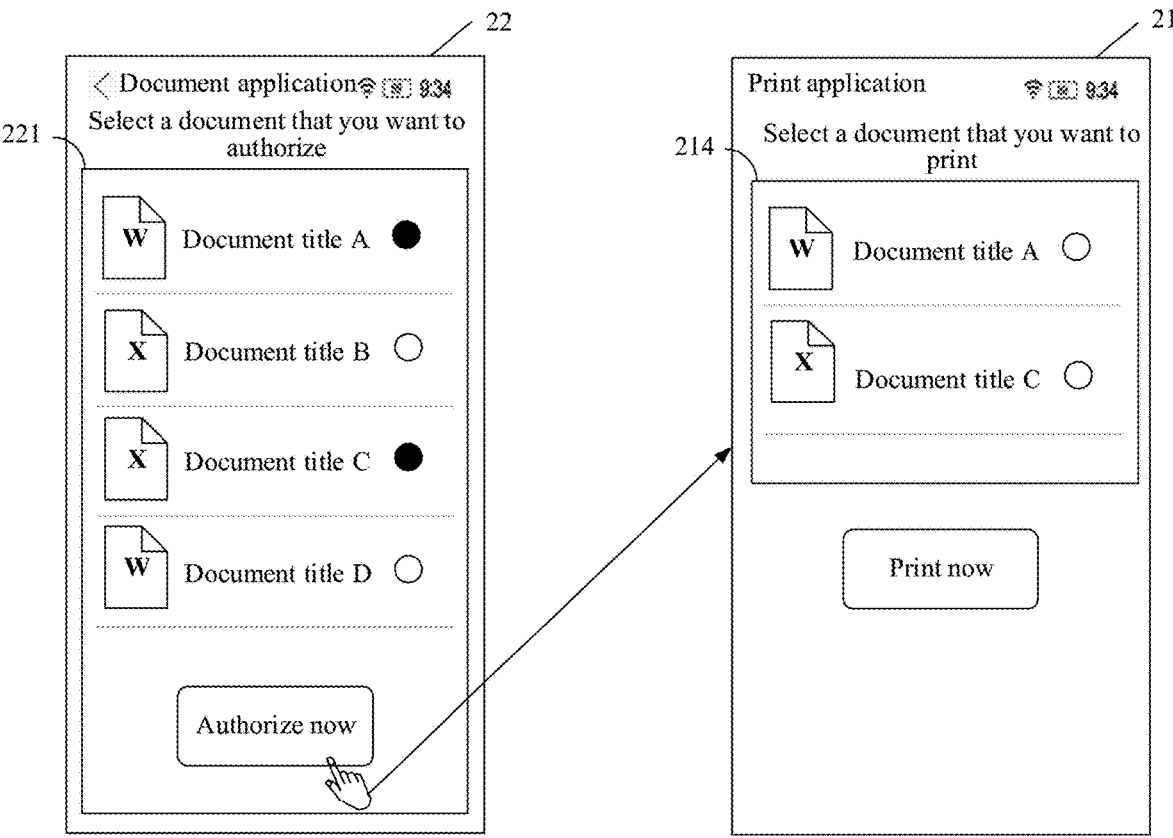
FIG. 2*c* is a schematic diagram of a scenario of displaying an authorized-document list according to an embodiment of the present disclosure.

For ease of understanding, refer to FIG. 2a to FIG. 2c. Implementation processes of FIG. 2a to FIG. 2c may be performed on the target application server 100a or the document application server 100b shown in FIG. 1, or may be performed on a terminal device (the terminal device 200a, the terminal device 200b, or the terminal device 200n shown in FIG. 1), or may be jointly performed by a terminal device and a server. This is not limited herein. In embodiments of the present disclosure, an example in which the implementation processes are jointly performed by a terminal device (to be specific, any terminal device in the terminal device cluster shown in FIG. 1), a print application server 20a (namely, the target application server 100a shown in FIG. 1), and a document application server 20b (namely, the document application server 100b shown in FIG. 1) is used for description.

FIG. 2a is a schematic diagram of a scenario of document source selection according to an embodiment of the present disclosure. As shown in FIG. 2a, an object associated with a terminal device is a first object, and an application client corresponding to a print application is integrated and installed on the terminal device. The terminal device may implement a function of printing document data through data exchange between the print application and a print application server 20a corresponding to the print application. The first object may be associated with a plurality of pieces of document data in a document application, and the document data may be stored on a document application server 20b corresponding to the document application. When the first object wants to obtain its own document data in the document application and print the document data by using the application client that corresponds to the print application and that is run on the terminal device, the first object may allow the print application to access only the document data that needs to be printed. To be specific, the first object may authorize, by using the terminal device, the document data that needs to be printed in the document application. The target application can have a permission to perform service processing only on the authorized document data. A process of authorizing, obtaining, and performing service processing on the document data can be implemented only through data exchange between the terminal device, the target application server 100a, and the document application server 100b. For a specific interaction process, see the following embodiments.

As shown in FIG. 2a, when the first object wants to print document data that is associated with the first object in the document application, the first object may first trigger the print application by using the terminal device, and the terminal device may display a print application interface 21. The print application interface 21 is displayed by the terminal device through the application client of the print application. The print application interface 21 may include a document print control 211. After the first object triggers the document print control 211, the terminal device displays a document data source list 212 on the print application interface 21. The document data source list 212 is configured for displaying a document data source mode available for selection by the first object. For example, the document data source list 212 may include a document source control 213. The document source control 213 is associated with the document application.

After the first object triggers the document source control 213, the terminal device needs to obtain the document data of the first object in the document application. However, to protect private data of the first object, the first object may first select an authorization scope of the document data. For ease of understanding, further refer to FIG. 2b. FIG. 2b is a schematic diagram of a scenario of authorization selection according to an embodiment of the present disclosure. As shown in FIG. 2b, after the first object triggers the document source control 213, the terminal device jumps to the document application in response to the trigger operation on the document source control 213, and then displays a document application interface 22 in the document application. The terminal device may display a to-be-authorized-document list 221 on the document application interface 22. The to-be-authorized-document list 221 may include one or more document titles, for example, a document title A, a document title B, a document title C, and a document title D. The document title may be a title that is in the document application and that corresponds to the document data associated with the first object. To be specific, the document title A may be associated with document data A, the document title B may be associated with document data B, the document title C may be associated with document data C, and the document title D may be associated with document data D. Document data corresponding to one document title may have different file formats. The file format is a special encoding method for information for the purpose of storing the information, for example, a document (DOC) or a form (XLSX). Document titles corresponding to document data in different file formats may have different display styles. As shown in FIG. 2*b*, the first object may select, based on the document title displayed in the to-be-authorized-document list 221, document data that the first object wants to authorize.

Further, FIG. 2*c* is a schematic diagram of a scenario of displaying an authorized-document list according to an embodiment of the present disclosure. As shown in FIG. 2*c*, assuming that the first object needs to print only the document data corresponding to the document title A and the document data corresponding to the document title C, the terminal device may jump back to the print application interface 21 in response to a trigger operation performed by the first object on the to-be-authorized-document list 221. A first authorized-document list 214 including a first title is displayed on the print application interface 21. The trigger operation on the to-be-authorized-document list 221 may include a selection operation on the document title A and the document title C and then a trigger operation on an authorization confirmation control. The first title is a triggered document title: the document title A and the document title C. The target application has a permission to perform service processing only on document data A1 corresponding to the document title A and document data C1 corresponding to the document title C. To be specific, in this case, the first object can print only the document data A1 and the document data C1 through the target application, and cannot print document data B1 corresponding to the document title B or document data D1 corresponding to the document title D.

Therefore, if the terminal device associated with the first object is lost or a use permission of the first object in the print application is stolen, other objects cannot obtain the document data B1 or the document data D1 of the first object in the document application through the print application. This improves security of document data of the first object in the document application, and reduces a possibility of leakage of private data of the first object.

Figure 3:
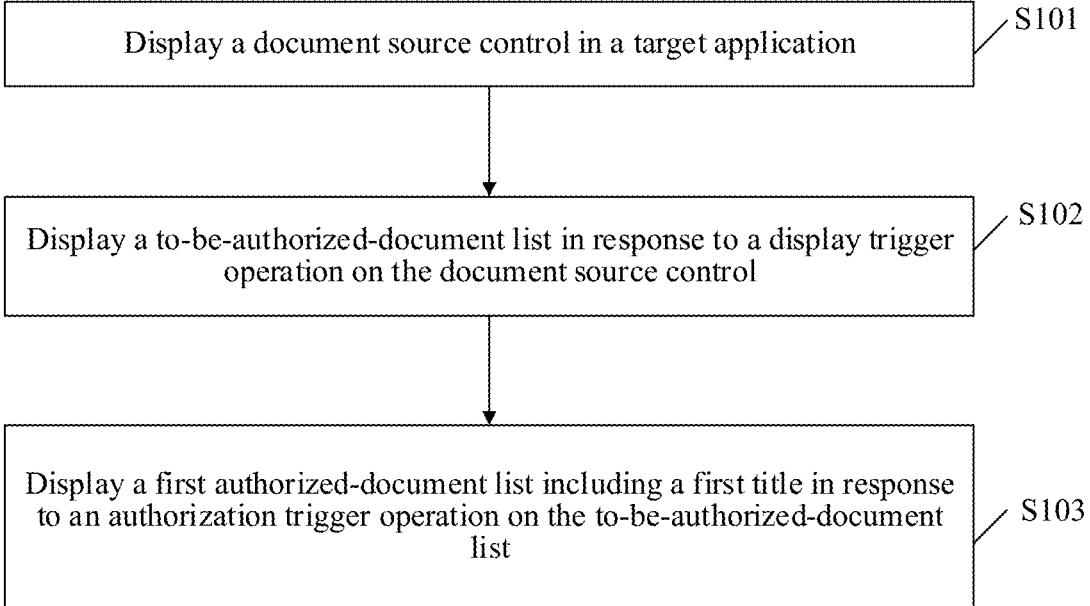
FIG. 3 is a schematic flowchart of a data processing method according to an embodiment of the present disclosure.

Further, FIG. 3 is a schematic flowchart of a data processing method according to an embodiment of the present disclosure. The data processing method may be performed by a computer device. The computer device may include the terminal device or the server in FIG. 1. The method may include the following operations:

S101: Display a document source control in a target application.

Specifically, in a document obtaining scenario, the target application may be an application other than a document application, and therefore may also be referred to as a third-party application. The target application has a capability of obtaining document data of an object and invoking a document function of the document application through a document function interface provided by the document application. To be specific, the object may access and use, in the target application, document data and a document function of the object in the document application. The document data may be a file. The document application may be a document website, software, or a system that supports multi-person collaboration and real-time cloud storage. To be specific, the document application allows a plurality of persons to edit a WORD, EXCEL, or PPT file or the like (namely, document data) and upload an edited file to a cloud server (for example, the document application server 100*b* shown in FIG. 1) for storage.

Specifically, the computer device may display the document source control in the target application in response to a data access operation. The document source control is associated with the document application.

In some embodiments, a plurality of document source controls may be displayed in the target application, and different document source controls are associated with different applications, such as an album application and a video application. The target application may determine an authorization scope of document data in the document application by triggering the document source control associated with the document application, and may also determine an authorization scope of media data in another application by triggering a document source control associated with the another application. The target application can access only authorized data. Only an example in which the target application accesses the document data in the document application is used for description herein.

S102: Display a to-be-authorized-document list in response to a display trigger operation on the document source control.

The to-be-authorized-document list includes one or more document titles. The one or more document titles include a title that is in the document application and that corresponds to document data associated with a first object. The first object is an object that has logged in to the document application through the target application.

The display trigger operation in this embodiment of the present disclosure and subsequently mentioned operations such as an authorization trigger operation, a control display trigger operation, a switching trigger operation, an extension list trigger operation, a document title trigger operation, a cancellation list trigger operation, a display cancellation trigger operation, a document processing trigger operation, an authorization trigger operation, an authorization list trigger operation, an account login operation, a select-all trigger operation, a local trigger operation, a source trigger operation, and a permission trigger operation may be independent of each other.

Specifically, a feasible implementation process of displaying the to-be-authorized-document list in response to the display trigger operation on the document source control may be as follows: displaying an account login page corresponding to the document application in response to the display trigger operation on the document source control; in response to an account login operation on the account login page, using, as the first object, an object associated with an account that has logged in; and displaying a to-be-authorized-document list that includes one or more document titles associated with the first object. Document data of the first object in the document application is usually associated with an account used by the first object to log in to the document application. Therefore, before displaying the to-be-authorized-document list, the computer device needs to first determine, in response to an account login operation, the account used by the first object to log in to the document application; then obtain a title corresponding to one or more pieces of document data associated with the first object as the one or more document titles; and then display the to-be-authorized-document list that includes the one or more document titles. The first object and an object that performs an operation by using the computer device may be a same object or different objects. Subsequently, the first object and the object that performs an operation by using the computer device are considered as a same object by default.

Before the to-be-authorized-document list is displayed, an authorization scope selection list may be further displayed (for example, the authorization scope selection list may be first displayed after the account login operation on the account login page is successfully responded to). The authorization scope selection list may include a local-scope authorization control. The computer device displays the to-be-authorized-document list only in response to an authorization trigger operation on the local-scope authorization control. In some embodiments, the authorization scope selection list further includes a global-scope authorization control. In this case, the computer device may further display, in response to an authorization list trigger operation on the global-scope authorization control, a second authorized-document list including a global authorized-document title. The global authorized-document title includes a title that is in the document application and that corresponds to each piece of document data associated with the first object. The authorization scope selection list is displayed by the computer device through the document application. The first object may choose to authorize a document data scope based on the authorization scope selection list, to be specific, authorize a document data scope accessible to the target application. The first object may choose not to authorize document data, authorize some document data, or authorize all document data. If the first object chooses to authorize all document data, the computer device does not need to display the to-be-authorized-document list.

Figure 4:
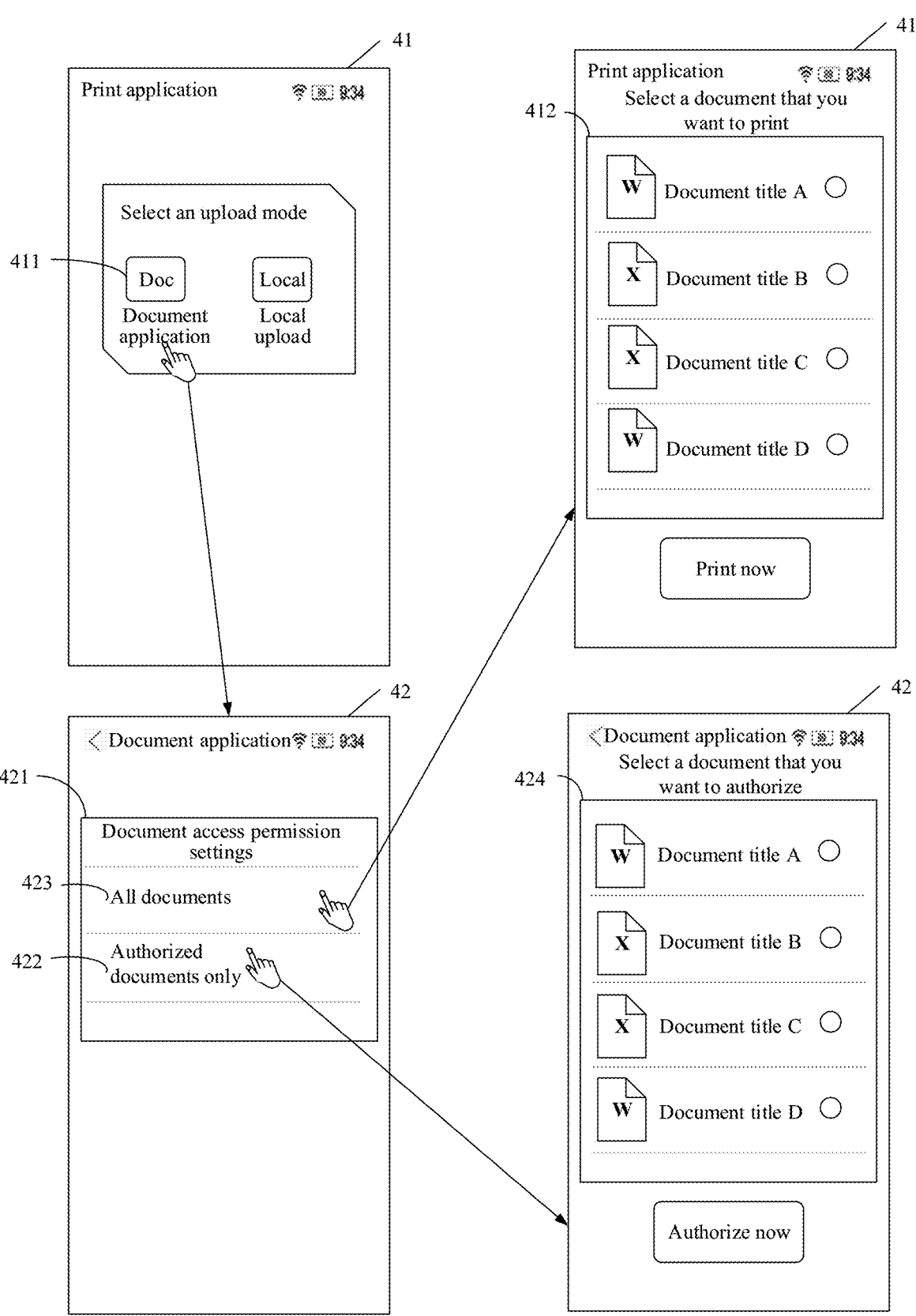
FIG. 4 is a schematic diagram of a scenario of document scope selection according to an embodiment of the present disclosure.

For ease of understanding the foregoing process of selecting a document data scope, further refer to FIG. 4. FIG. 4 is a schematic diagram of a scenario of document data scope selection according to an embodiment of the present disclosure. An example in which the target application is a print application is still used. As shown in FIG. 4, the computer device (which may be any terminal device shown in FIG. 1, for example, the terminal device 200*a*) displays a print application interface 41 in the print application and displays a document source control 411 on the print application interface 41. The computer device jumps to the document application in response to a trigger operation on the document source control 411, displays a document application interface 42 in the document application, and then displays an authorization scope selection list 421 on the document application interface 42. The authorization scope selection list 421 may include a local-scope authorization control 422 on which "Authorized documents only" is displayed and a global-scope authorization control 423 on which "All documents" is displayed. In response to a trigger operation on the local-scope authorization control 422, the computer device displays a to-be-authorized-document list 424 on the document application interface 42, and the first object may select, based on the to-be-authorized-document list 424, specific document data that the first object wants to authorize. In response to a trigger operation on the global-scope authorization control 423, the computer device jumps back to the print application interface 41, and then displays, on the print application interface 41, a second authorized-document list 412 including a global authorized-document title.

In some embodiments, a sorting position of the one or more document titles in the to-be-authorized-document list may be determined based on a degree of matching between document data corresponding to the document title and an application type of the target application. A display position of a document title with a higher degree of matching precedes a display position of a document title with a lower degree of matching. The degree of matching may be determined by a matching degree calculation model based on an application type feature of the target application and a content feature of the document data. For example, when the target application is an automobile application, a degree of matching between the target application and document data that includes automobile-related knowledge is certainly higher than a degree of matching between the target application and other document data that does not include automobile-related knowledge. In this case, a document title corresponding to the document data that includes automobile-related knowledge may be preferentially displayed in the to-be-authorized-document list. In addition, the computer device may further display, in the to-be-authorized-document list by using a pre-recommended display style, a document title corresponding to document data whose degree of matching with the target application is higher than a matching threshold, for example, highlight the document title, to remind an object.

S103: Display a first authorized-document list including a first title in response to an authorization trigger operation on the first title in the to-be-authorized-document list.

The first title is a document title that is in the to-be-authorized-document list and that is triggered by the authorization trigger operation. The authorization trigger operation enables the target application to have a permission to perform service processing on document data corresponding to the first title.

Specifically, after the computer device displays the first authorized-document list in the target application, the first object may perform, through the target application, corresponding service processing on the document data corresponding to the first title in the first authorized-document list.

In some embodiments, if document data corresponding to an intermediate authorized-document title includes at least two pieces of sub-document data, a sub-document authorization list for the intermediate authorized-document title is displayed. The sub-document authorization list includes a select-all control and sub-document titles respectively corresponding to the at least two pieces of sub-document data. The intermediate authorized-document title is a document title that is triggered in the to-be-authorized-document list and that has not been added to the first authorized-document list. In response to a select-all trigger operation on the select-all control, the intermediate authorized-document title is determined as the first title, and the operation of displaying a first authorized-document list including a first title is performed. In response to a local trigger operation on at least two sub-document titles in the sub-document authorization list, a third authorized-document list including a local authorized-document title is displayed by using the intermediate authorized-document title as the local authorized-document title and using sub-document data corresponding to the triggered sub-document titles as document data corresponding to the local authorized-document title. The local trigger operation enables the target application to have a permission to perform service processing on the document data corresponding to the local authorized-document title. It can be learned from the foregoing descriptions that document data may be a WORD, EXCEL, or PPT file or another type of file. These files may include a plurality of subfiles (namely, sub-document data). For example, when the document data is a form file, the form file may include a plurality of form subfiles. In this case, the first object may alternatively choose to authorize only one form subfile in the form file.

Figure 5:
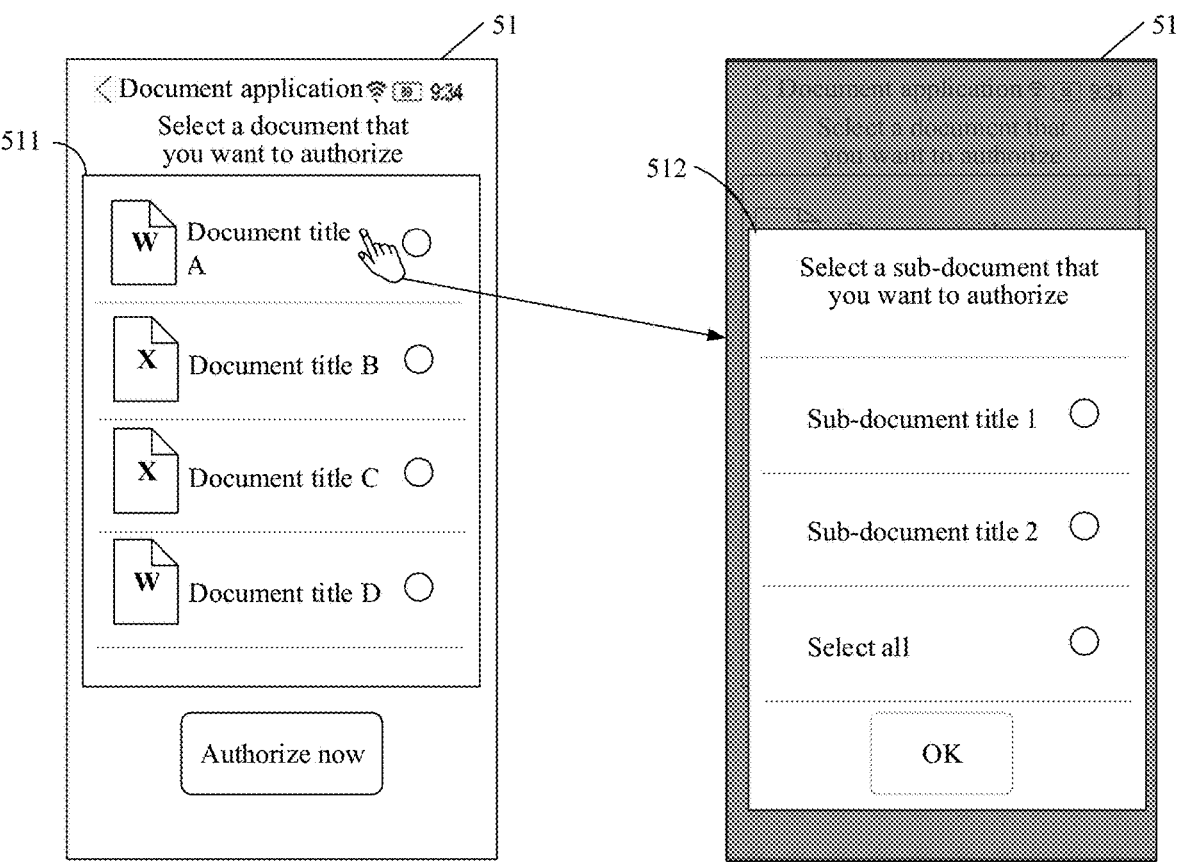
FIG. 5 is a schematic diagram of a scenario of multi-dimensional document scope selection according to an embodiment of the present disclosure.

For ease of understanding, further refer to FIG. 5. FIG. 5 is a schematic diagram of a scenario of sub-document data scope selection according to an embodiment of the present disclosure. An example in which the target application is a print application is still used. As shown in FIG. 5, the computer device (which may be any terminal device shown in FIG. 1, for example, the terminal device 200a) displays a document application interface 51 in the document application, and a to-be-authorized-document list 511 is displayed on the document application interface 51. The to-be-authorized-document list 511 includes a document title A, a document title B, a document title C, and a document title D. Assuming that document data corresponding to the document title A includes two pieces of sub-document data, the computer device further displays a sub-document authorization list 512 for the document title A in response to a trigger operation on the document title A. The sub-document authorization list 512 includes a sub-document title 1, a sub-document title 2, and a select-all control. The first object may select, based on the sub-document authorization list 512, sub-document data that the first object wants to authorize. Assuming that the first object selects only the sub-document title 1, the computer device can print, through the print application, only sub-document data corresponding to the sub-document title 1, and cannot access sub-document data corresponding to the sub-document title 2.

In some embodiments, the first authorized-document list further includes an unauthorized-document title. The unauthorized-document title is a document title in the one or more document titles other than the first title. A display style of the first title is a selected style. A display style of the unauthorized-document title is an unselected style. The target application has no permission to perform service processing on document data corresponding to the unauthorized-document title. In this case, the computer device may further display, in response to a control display trigger operation on the unauthorized-document title in the first authorized-document list, a permission change control for a target title by using the triggered unauthorized-document title as the target title; and switch a display style of the target title from an unselected style to a selected style in response to a switching trigger operation on the permission change control, and use the target title as a new authorized-document title. The switching trigger operation enables the target application to have a permission to perform service processing on document data corresponding to the new authorized-document title. To be specific, in addition to the first title, an unauthorized-document title corresponding to unauthorized document data may be further displayed in the first authorized-document list, but the target application cannot access the document data corresponding to the unauthorized-document title. For ease of distinguishing between the first title and the unauthorized-document title, display styles of the two titles are different. To be specific, the selected style and the unselected style are different.

A feasible implementation process of displaying, in response to the trigger operation on the unauthorized-document title in the first authorized-document list, the permission change control for the target title by using the triggered unauthorized-document title as the target title may be as follows: displaying, in response to a first display trigger suboperation on the unauthorized-document title in the first authorized-document list, an error prompt box associated with a target title by using the triggered unauthorized-document title as the target title. The error prompt box includes permission error prompt information and a permission change guide control. The permission error prompt information is configured for indicating that the target application has no permission to perform service processing on document data corresponding to the target title. Then the computer device may display a permission change control for the target title in response to a second display trigger suboperation on the permission change guide control. To be specific, in this implementation, the first display trigger suboperation and the second display trigger suboperation may be used as the control display trigger operation to implement the display of the permission change control.

Figure 6:
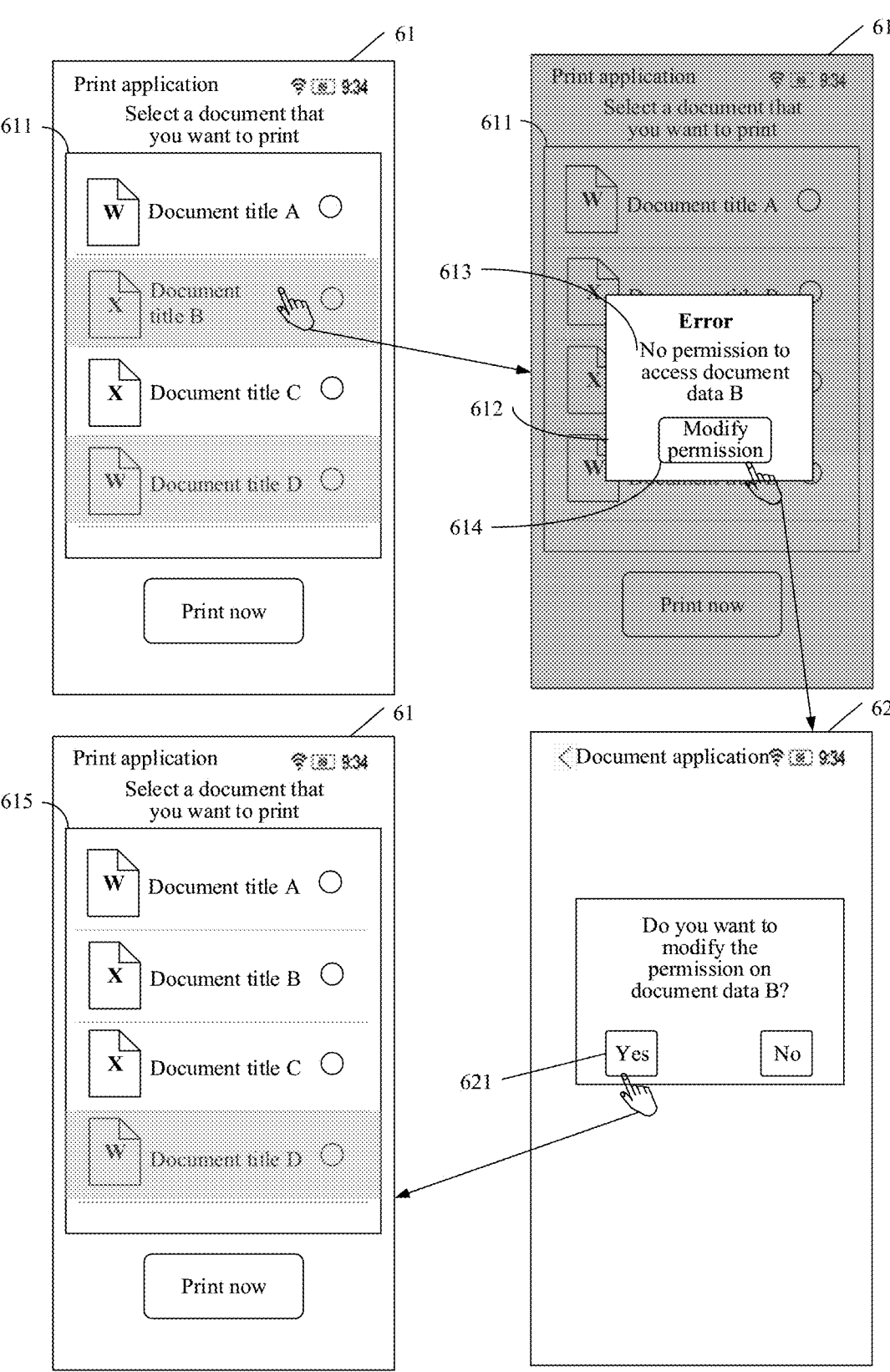
FIG. 6 is a schematic diagram of a scenario of a document authorization change according to an embodiment of the present disclosure.

For ease of understanding, further refer to FIG. 6. FIG. 6 is a schematic diagram of a scenario of a document authorization change according to an embodiment of the present disclosure. An example in which the target application is a print application is still used. As shown in FIG. 6, the computer device (which may be any terminal device shown in FIG. 1, for example, the terminal device 200a) displays a print application interface 61 in the document application, and a first authorized-document list 611 may be displayed on the print application interface 61. A document title A, a document title B, a document title C, and a document title D are displayed in the first authorized-document list 611. It is assumed that document data corresponding to the document title A and document data corresponding to the document title C are authorized document data, and document data corresponding to the document title B and document data corresponding to the document title D are unauthorized document data. It can be learned from FIG. 6 that, display styles of the document title A and the document title C are the same, and both are selected styles without any shading, to indicate that corresponding document data is accessible; and display styles of the document title B and the document title D are the same, and both are unselected styles (shaded), to indicate that corresponding document data is inaccessible. Assuming that the first object suddenly wants to print the document data corresponding to the document title B, the first object may click the document title B. In response to the trigger operation on the document title B, the computer device determines that the print application has no permission to perform service processing on the document data corresponding to the document title B. In this case, the computer device may display an error prompt box 612 on the print application interface 61. The error prompt box 612 may include permission error prompt information 613 and a permission change guide control 614. The permission error prompt information 613 is an error message. For example, the permission error prompt information 613 may be as follows: "Error. No permission to access document data B (namely, the document data corresponding to the document title B)." If the first object still wants to print the document data B, the first object may trigger the permission change guide control 614. Then the computer device may jump to a document application interface 62 in response to the trigger operation on the permission change guide control 614, and display a permission change control 621 on the document application interface 62. If the first object determines to modify a permission on the document data B, the first object may trigger the permission change control 621. In this case, the computer device jumps back to the print application interface 61, and then displays a new authorized-document list 615 on the print application interface 61.

In some embodiments, the first authorized-document list may further include an unauthorized-document extension control. In this case, the computer device may further display an authorized-document extension list in response to an extension list trigger operation on the authorized-document extension control, the authorized-document extension list including an unauthorized-document title; and the unauthorized-document title being a document title in the one or more document titles other than the first title; and display, in response to a document title trigger operation on the unauthorized-document title in the authorized-document extension list, an extended authorized-document title in a blank area of the first authorized-document list by using the triggered unauthorized-document title as the extended authorized-document title, the document title trigger operation granting the target application a permission to perform service processing on document data corresponding to the extended authorized-document title. To be specific, after authorizing document data based on the to-be-authorized-document list, the first object may further re-authorize unauthorized document data by using the authorized-document extension control.

In some embodiments, the first authorized-document list may further include an authorized-document cancellation control. In this case, the computer device may further display an authorized-document cancellation list in response to a cancellation list trigger operation on the authorized-document cancellation control, the authorized-document cancellation list including the first title; and cancel, in response to a display cancellation trigger operation on the first title in the authorized-document cancellation list, display of an unauthorized-document title in the first authorized-document list by using the triggered first title as the unauthorized-document title, the display cancellation trigger operation enabling the target application to have no permission to perform service processing on document data corresponding to the unauthorized-document title. To be specific, after authorizing document data based on the to-be-authorized-document list, the first object may further cancel the authorization for the authorized document data by using the authorized-document cancellation control.

In the method provided in embodiments of the present disclosure, when the first object needs to access document data in the document application while using the target application, the first object may autonomously select document data to be authorized to the target application, and the target application can have a permission to perform service processing only on the authorized document data. Therefore, other unauthorized document data is not exposed to the target application. This protects data privacy of the first object to the maximum extent, and improves security of the document data in the document application.

Figure 7:
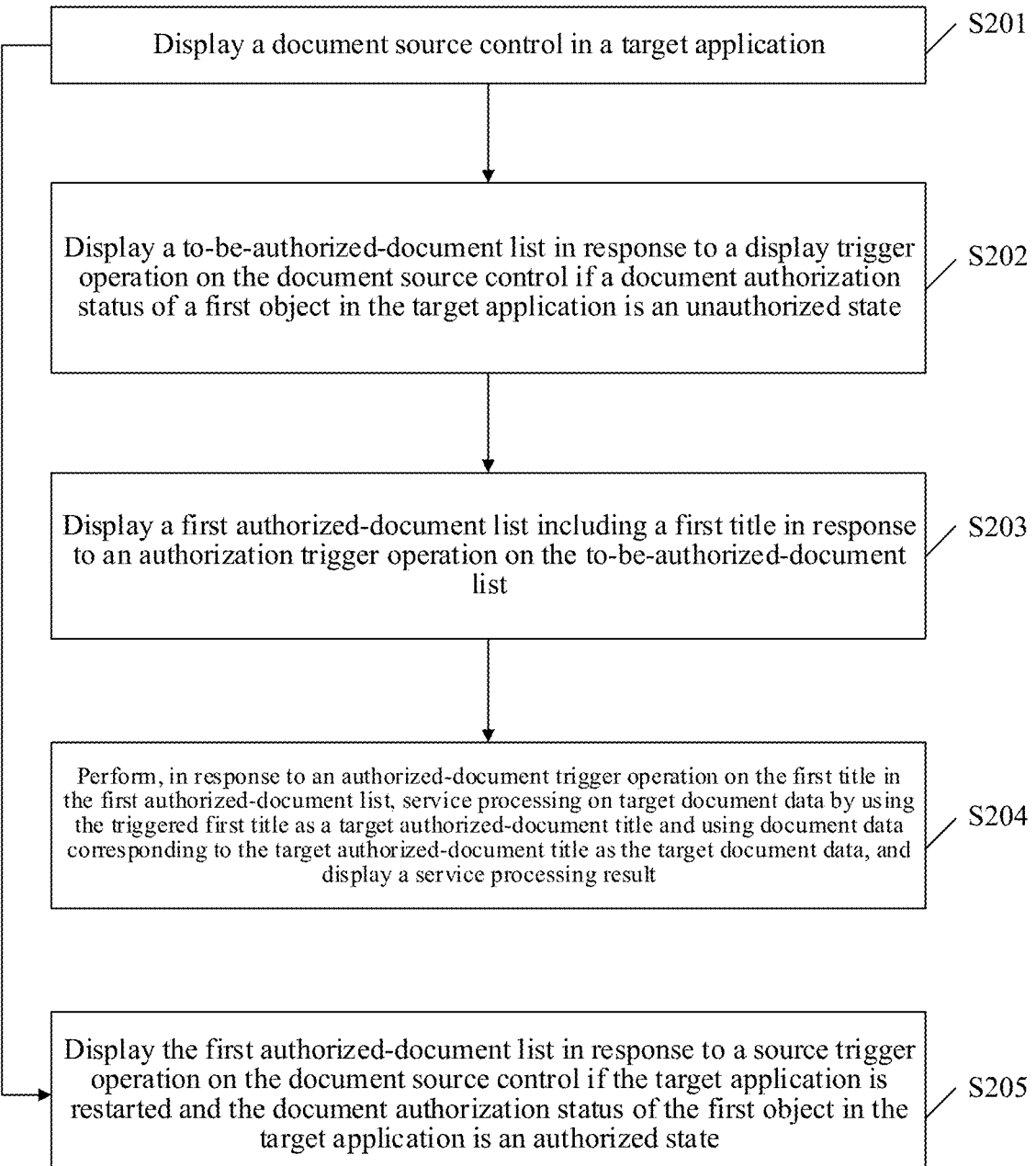
FIG. 7 is a schematic flowchart of a data processing method according to an embodiment of the present disclosure.

Further, FIG. 7 is a schematic flowchart of a data processing method according to an embodiment of the present disclosure. The data processing method may be performed by a computer device. The computer device may include the terminal device or the server in FIG. 1. The method may include the following operations:

S201: Display a document source control in a target application.

Specifically, for an implementation process of S201, refer to the foregoing descriptions of S101. Details are not described herein again.

S202: Display a to-be-authorized-document list in response to a display trigger operation on the document source control if a document authorization status of a first object in the target application is an unauthorized state.

The to-be-authorized-document list includes one or more document titles. The one or more document titles include a title that is in a document application and that corresponds to document data associated with the first object. The first object is an object that has logged in to the document application through the target application.

Specifically, that the document authorization status of the first object in the target application is the unauthorized state means a state in which the first object has not authorized the target application to use document data in the document application, or a state in which a validity period of document data that the first object authorizes the target application to use has expired.

Specifically, document functions of the document application may be encapsulated into a series of data interfaces easily recognizable to a computer for use by a third-party developer. A data interface corresponding to a document function is a document function interface. When obtaining document data in the document application, the target application may obtain the document data through a document function interface provided by the document application. In addition to obtaining the document data through the document function interface, the target application may further invoke, through the document function interface, a document function provided by the document application. The first object may also select a scope of document function interfaces that the target application is allowed to invoke. Usually, the computer device may first authorize a document function interface that the target application is allowed to invoke, and then authorize document data that the target application is allowed to obtain. In this case, a feasible implementation process of displaying the to-be-authorized-document list in response to the trigger operation on the document source control may be as follows: displaying a to-be-authorized-function list in response to the display trigger operation on the document source control, the to-be-authorized-function list including one or more document permission controls, and a document permission control being associated with a document function interface corresponding to the document application; and displaying, in response to a permission trigger operation on the one or more document permission controls, a to-be-authorized-document list associated with an authorized document function interface by using the triggered document permission control as an authorized permission control, the authorized document function interface being a document function interface associated with the authorized permission control, and the permission trigger operation granting the target application a permission to invoke the authorized document function interface through the document application.

Figure 8:
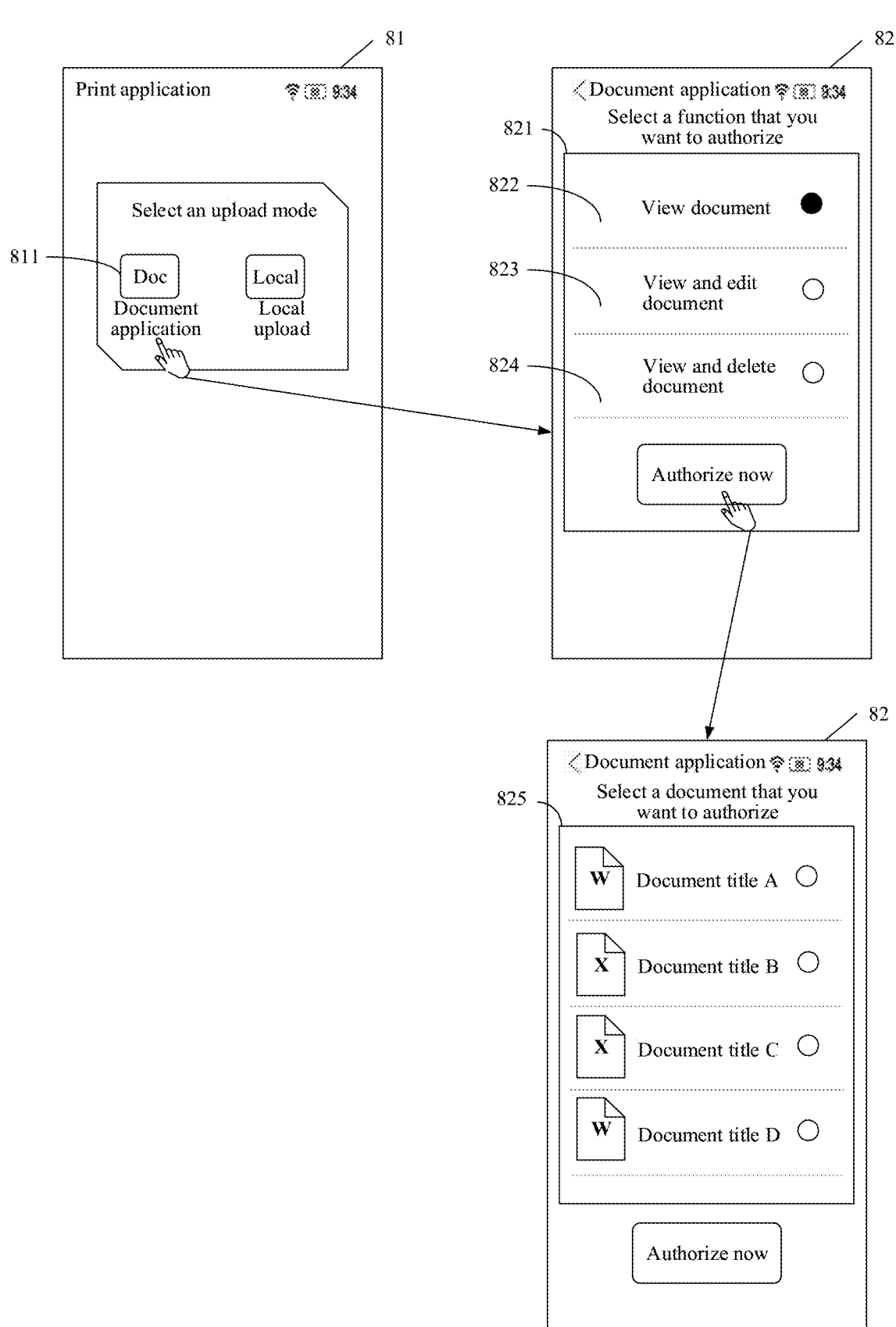
FIG. 8 is a schematic diagram of a scenario of document function interface selection according to an embodiment of the present disclosure.

For ease of understanding, further refer to FIG. 8. FIG. 8 is a schematic diagram of a scenario of document function interface selection according to an embodiment of the present disclosure. An example in which the target application is a print application is still used. As shown in FIG. 8, the computer device (which may be any terminal device shown in FIG. 1, for example, the terminal device 200*a*) displays a print application interface 81 in the print application and displays a document source control 811 on the print application interface 81. The computer device jumps to the document application in response to a trigger operation on the document source control 811, displays a document application interface 82 in the document application, and then displays a to-be-authorized-function list 821 on the document application interface 82. The to-be-authorized-function list 821 may include one or more document permission controls, for example, a document permission control 822, a document permission control 823, and a document permission control 824. A document function interface corresponding to the document permission control 822 may be invoked to use a "View document" function provided by the document application. A document function interface corresponding to the document permission control 823 may be invoked to use a "View and edit document" function provided by the document application. A document function interface corresponding to the document permission control 824 may be invoked to use a "View and delete document" function provided by the document application. In response to a trigger operation on the one or more document permission controls, the computer device may use a triggered document permission control as an authorized permission control, and then the computer device may display a to-be-authorized-document list 825 associated with an authorized document function interface. Assuming that the triggered document permission control is only the document permission control 822, the authorized permission control is the document permission control 822. In this case, the target application has a permission to invoke, through the document application, a document function interface corresponding to the document permission control 822. To be specific, the target application can use only the "View document" function provided by the document application for document data that is authorized by the computer device in response to a trigger operation on the to-be-authorized-document list 825. In other words, the target application cannot edit or delete document data that is authorized later.

A feasible implementation process of displaying, in response to the permission trigger operation on the one or more document permission controls, the to-be-authorized-document list associated with the authorized document function interface by using the triggered document permission control as the authorized permission control may be as follows: In response to the permission trigger operation on the one or more document permission controls, a permission opening request for the authorized document function interface is generated by using the triggered document permission control as the authorized permission control, and the permission opening request is transmitted to a document application server. Then the document application server may perform permission opening for the authorized document function interface to obtain a permission grant result, and return the permission grant result to the computer device. If the computer device receives the permission grant result transmitted by the document application server, the computer device may display, based on the permission grant result, the to-be-authorized-document list associated with the authorized document function interface. The document application server is a background server corresponding to the document application, and may provide data and computing support for operation of the document application. The permission opening means configuring a permission for the target application to invoke the authorized document function interface. If the permission opening succeeds, the document application server may determine that a permission opening result is the permission grant result. In this case, the target application has a permission to invoke the authorized document function interface. If the permission opening fails, the document application server may determine that a permission opening result is a permission error result. If the computer device receives the permission error result, the computer device may guide the first object to an authorization selection process for a document function interface again.

In some embodiments, it can be learned from S102 that a first authorized-document list further includes an unauthorized-document title, and the computer device may display, in response to a control display trigger operation on the unauthorized-document title in the first authorized-document list, a permission change control for a target title by using the triggered unauthorized-document title as the target title. A specific implementation process may be as follows: In response to the control display trigger operation on the unauthorized-document title in the first authorized-document list, by using the triggered unauthorized-document title as the target title, the computer device first generates a second service request for the target title, and transmits the second service request to a target application server. The second service request may be configured for requesting the target application server to perform service processing on document data corresponding to the target title. The document data corresponding to the target title is stored on a document application server. The target application server needs to first determine whether the target application has an access permission to access the document data that corresponds to the target title and that is stored on the document application server. Therefore, the target application server may generate a second service permission verification request based on the second service request. The second service permission verification request includes a data authorization token, a target to-be-invoked document function interface, and the target title. Then the target application server transmits the second service permission verification request to the document application server. The data authorization token is generated by the document application server by performing data authorization on a first title. The document application server may determine, based on the data authorization token, authorized document data (including only document data corresponding to the first title) accessible to the target application and an authorized document function interface that the target application is allowed to invoke. The target to-be-invoked document function interface is a document function interface that needs to be invoked in response to a trigger operation on the target title. After receiving the second service permission verification request, the document application server determines, based on the second service permission verification request, whether an authorized document function interface associated with the data authorization token includes the target to-be-invoked document function interface and whether an authorized-document title associated with the data authorization token includes the target title. If the document application server determines that the authorized document function interface associated with the data authorization token includes the target to-be-invoked document function interface but the authorized-document title associated with the data authorization token does not include the target title, the document application server may generate error code information, and then transmit the error code information to the target application server. In this case, the target application server cannot obtain, in response to the second service request, the document data corresponding to the unauthorized-document title. The target application server may generate permission verification failure information based on the error code information transmitted by the document application server, and then transmit the permission verification failure information to the computer device. Finally, if the computer device receives the permission verification failure information transmitted by the target application server, the computer device may first guide the first object to authorization for the target title, to be specific, display the permission change control for the target title.

S203: Display the first authorized-document list including the first title in response to an authorization trigger operation on the first title in the to-be-authorized-document list.

The first title is a triggered document title. The authorization trigger operation enables the target application to have a permission to perform service processing on the document data corresponding to the first title.

Specifically, a feasible implementation process of displaying the first authorized-document list including the first title in response to the authorization trigger operation on the to-be-authorized-document list may be as follows: A triggered document title is used as the first title in response to the authorization trigger operation on the to-be-authorized-document list. A data authorization request is generated based on the first title, and the data authorization request is transmitted to the document application server. Then the document application server may perform data authorization on the first title based on the data authorization request to obtain a data authorization token for the first title, and transmit the data authorization token to the target application server. The data authorization token is associated with the first title and an authorized document function interface. The data authorization token is a permission credential. The data authorization token can prove that the target application having the data authorization token has a permission to invoke the authorized document function interface through the document application and a permission to perform service processing on the document data corresponding to the first title. After receiving and storing the data authorization token, the target application server generates authorization acknowledgement information, and then transmits the authorization acknowledgement information to the computer device. If the computer device receives the authorization acknowledgement information transmitted by the target application server, the computer device displays the first authorized-document list including the first title. When the target application subsequently needs to invoke the authorized document function interface or obtain the document data corresponding to the first title, a request transmitted to the document application server may carry the data authorization token, and the document application server may authenticate the received request based on the data authorization token. If the target application can be used only after login, a data authorization token generated by a trigger operation performed by an object needs to be bound to a target application account corresponding to a logged-in object (which may be the first object or an object other than the first object) that currently logs in to the target application. In other words, the data authorization token can be subsequently used only when the target application account corresponding to the logged-in object is used to log in to the target application.

S204: Perform, in response to an authorized-document trigger operation on the first title in the first authorized-document list, service processing on target document data by using the triggered first title as a target authorized-document title and using document data corresponding to the target authorized-document title as the target document data, and display a service processing result.

Specifically, the performing service processing on target document data may include: performing target application processing on the target document data by using a target application function provided by the target application, and performing document processing on the target document data by using a document function provided by the document application. For example, if the target application is a print application, the print application may provide a function of printing the target document data, and the document application may provide document functions of viewing, editing, and deleting the target document data, and the like.

Specifically, the trigger operation on the first title includes a document function trigger operation. In this case, a feasible implementation process of performing, in response to the authorized-document trigger operation on the first title in the first authorized-document list, service processing on the target document data by using the triggered first title as the target authorized-document title and using the document data corresponding to the target authorized-document title as the target document data, and displaying the service processing result may be as follows: in response to the document function trigger operation on the first title in the first authorized-document list, by using the triggered first title as the target authorized-document title and using the document data corresponding to the target authorized-document title as the target document data, jumping to the document application, and displaying a document browsing interface in the document application, the document browsing interface including the target document data.

Figure 9:
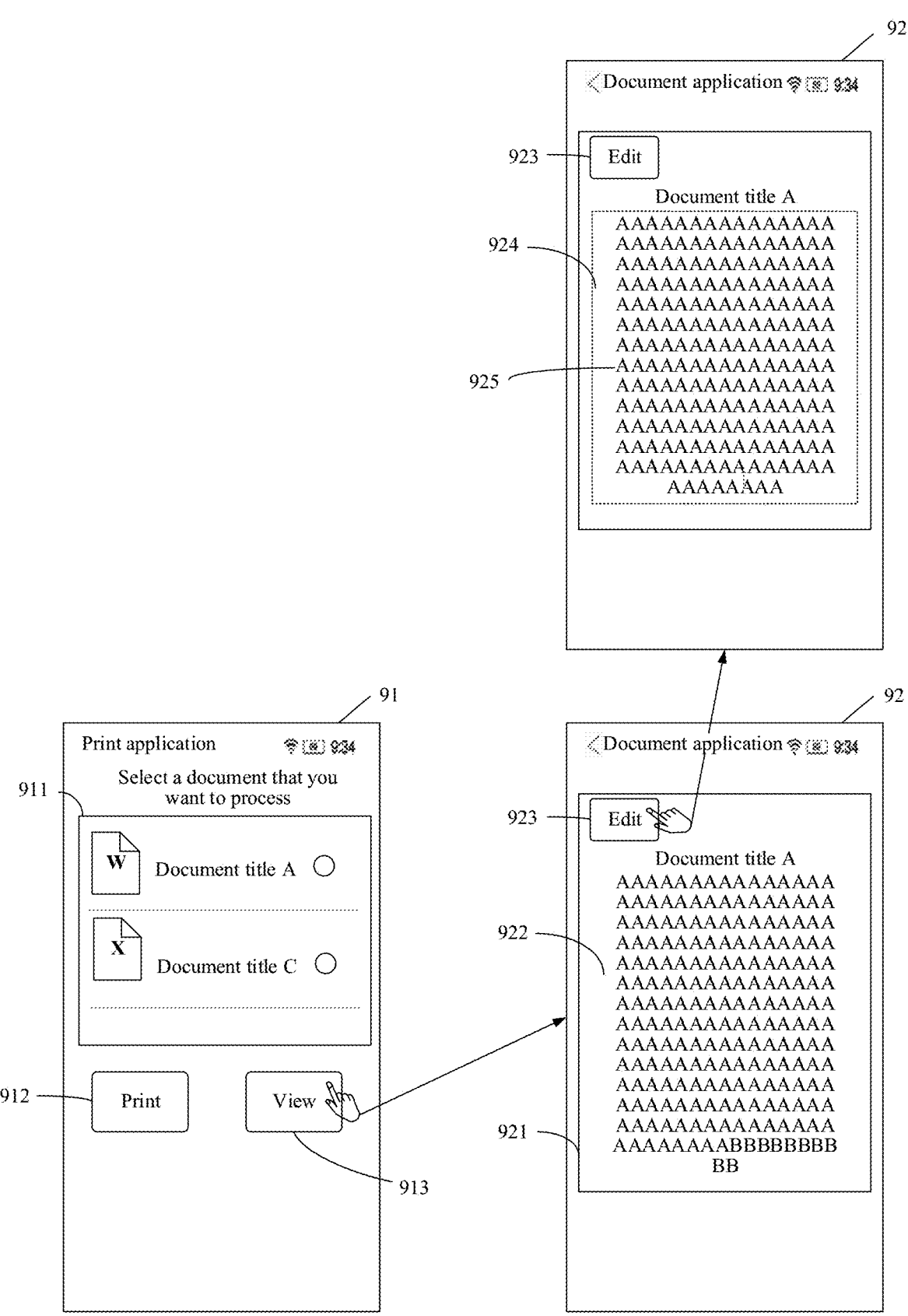
FIG. 9 is a schematic diagram of a scenario of document function invocation according to an embodiment of the present disclosure.

For ease of understanding, further refer to FIG. 9. FIG. 9 is a schematic diagram of a scenario of document function invocation according to an embodiment of the present disclosure. An example in which the target application is a print application is still used. As shown in FIG. 9, the computer device (which may be any terminal device shown in FIG. 1, for example, the terminal device 200a) may display a print application interface 91 in the print application and display a first authorized-document list 911 on the print application interface 91. The first authorized-document list 911 may include a document title A and a document title C. A print function control 912 and a view function control 913 may be further displayed on the print application interface 91. The print function control 912 may be associated with a print function provided by the print application. When the first object selects the document title A as a target authorized-document title and triggers the print function control 912, the computer device may print target document data corresponding to the target authorized-document title. The view function control 913 may be associated with a document function provided by the document application. In response to a document function trigger operation for the document title A, to be specific, an operation of first triggering the document title A and then triggering the view function control 913, the computer device may jump to the document application and then display a document application interface 92. A document browsing interface 921 is displayed on the document application interface 92. Target document data 922 corresponding to the document title A may be displayed on the document browsing interface 921.

In some embodiments, the document browsing interface further includes a document function control, and the computer device may further perform document processing on the target document data in response to a document processing trigger operation on the document function control, and display target document data obtained through document processing on the document browsing interface.

For ease of understanding, still refer to FIG. 9. As shown in FIG. 9, the document browsing interface 921 may further include an edit function control 923. The computer device may display a document edit box 924 in response to a trigger operation on the edit function control 923. The first object may edit the target document data 922 by using the document edit box 924. The computer device displays edited target document data, for example, target document data 925, on the document browsing interface 921.

Specifically, a feasible implementation process of performing, in response to the authorized-document trigger operation on the first title in the first authorized-document list, service processing on the target document data by using the triggered first title as the target authorized-document title and using the document data corresponding to the target authorized-document title as the target document data, and displaying the service processing result may be as follows:

In response to the authorized-document trigger operation on the first title in the first authorized-document list, by using the triggered first title as the target authorized-document title, a first service request for the target authorized-document title is generated, and the first service request is transmitted to the target application server. Then the target application server generates a first service permission verification request based on the first service request, and transmits the first service permission verification request to the document application server. The first service permission verification request includes a data authorization token, a target to-be-invoked document function interface, and the target authorized-document title. The data authorization token is generated by the document application server by performing data authorization on the first title. The target to-be-invoked document function interface is a document function interface that needs to be invoked in response to a trigger operation on the first title. If the computer device receives permission verification success information transmitted by the target application server, the computer device may perform service processing on the target document data by using the document data corresponding to the target authorized-document title as the target document data, and display a service processing result. The permission verification success information is generated by the target application server after receiving an authentication success result transmitted by the document application server The authentication success result is generated by the document application server when determining, based on the first service permission verification request, that an authorized document function interface associated with the data authorization token includes the target to-be-invoked document function interface and that an authorized-document title associated with the data authorization token includes the target authorized-document title.

S205: Display the first authorized-document list in response to a source trigger operation on the document source control if the target application is restarted and the document authorization status of the first object in the target application is the authorized state.

Specifically, a feasible implementation process of displaying the first authorized-document list in response to the source trigger operation on the document source control if the target application is restarted and the document authorization status of the first object in the target application is the authorized state may be as follows: If the target application is restarted, in response to the source trigger operation on the document source control, a list obtaining request is generated, and the list obtaining request is transmitted to the target application server. The target application server may generate a permission verification request based on the list obtaining request and a data authorization token associated with the first object, and transmits the permission verification request to the document application server, the data authorization token being obtained by the document application server by performing data authorization on the first title. When determining, based on the permission verification request, that the data authorization token is associated with an authorized document function interface, the document application server obtains the first title associated with the data authorization token, and transmits the first title to the computer device. If the computer device receives the first title transmitted by the document application server, the computer device may determine that the document authorization status of the first object in the target application is the authorized state, and display the first authorized-document list. In short, upon the first request to obtain document data in the document application through the target application, a data authorization token is generated after the document data and a document function interface are authorized, and the target application server corresponding to the target application stores the data authorization token. Upon a next request to obtain document data in the document application through the target application, the target application server may confirm, with the document application server based on the stored data authorization token, the document data and the document function interface that are authorized last time. To be specific, document data in the document application does not need to be authorized upon each request to obtain the same document data.

In the method provided in embodiments of the present disclosure, when the first object needs to access document data in the document application while using the target application, the first object may autonomously select document data to be authorized to the target application, and the target application can have a permission to perform service processing only on the authorized document data. Therefore, other unauthorized document data is not exposed to the target application. This protects data privacy of the first object to the maximum extent, and improves security of the document data in the document application.

Figure 10:
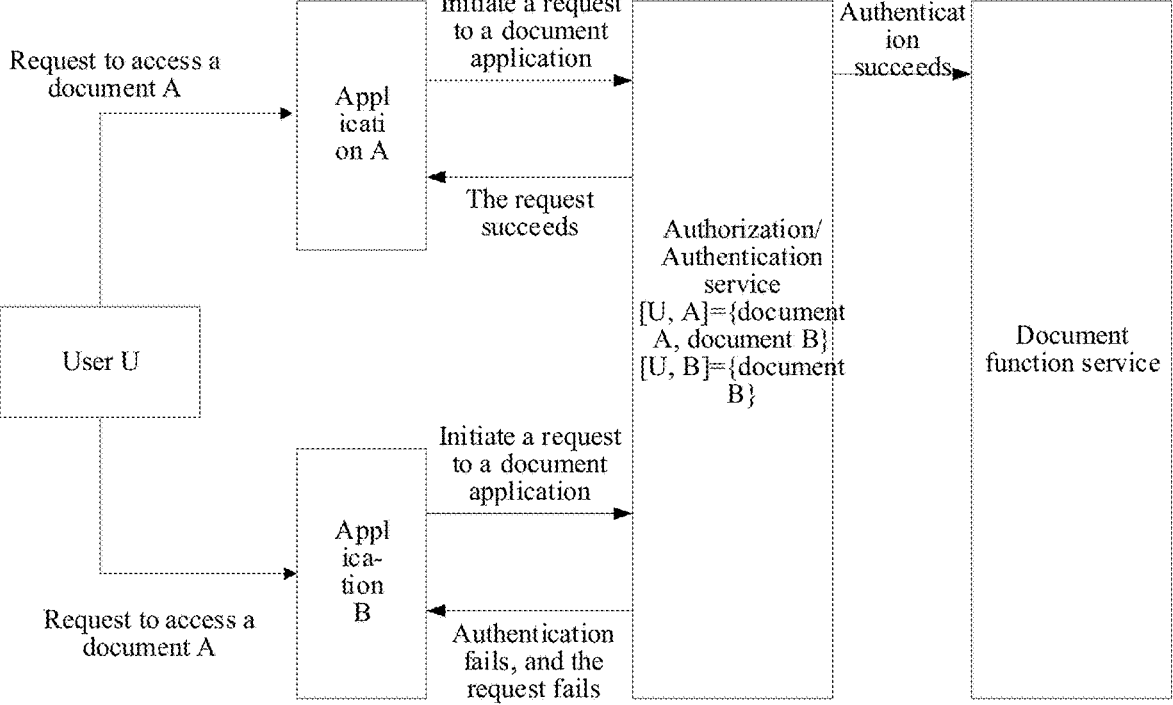
FIG. 10 is a schematic diagram of a request of a document function interface according to an embodiment of the present disclosure.

Further, FIG. 10 is a schematic diagram of a request of a document function interface according to an embodiment of the present disclosure. As shown in FIG. 10, it is assumed that an object U authorizes an application A and an application B separately, a permission on a document A and a document B in the document application is granted to the application A, and a permission on the document B in the document application is granted to the application B. In this case, the following cases occur when the object U requests, through the application A and the application B separately, to perform an operation on the document A in the document application:

(1) As shown in FIG. 10, the object U wants to access the document A through the application A. The application A initiates a request to the document application by using a ticket [U, A] (to be specific, the foregoing data authorization token generated by authorizing document data) of the object U. An authentication service of the document application determines whether the ticket [U, A] has an access permission on the corresponding document A. The authentication service may record [U, A]={document A, document B}. Therefore, the authentication service may determine that the object U has a permission to request the document A through the application A. In other words, the authentication succeeds. The authentication service transmits the request to a document function service.

(2) As shown in FIG. 10, the object U wants to access the document A through the application B. The application B initiates a request to the document application by using a ticket [U, B] (to be specific, the foregoing data authorization token generated by authorizing document data) of the object U. An authentication service of the document application determines whether the ticket [U, B] has an access permission on the corresponding document A. The authentication service may record [U, B]={document B}. Therefore, the authentication service may determine that the object U has no permission to request the document A through the application B. In other words, the authentication fails. The authentication service returns authentication failure and request failure prompt information to the application B.

It can be learned that, in the method provided in embodiments of the present disclosure, when a third-party application (namely, the target application) requests document data in the document application, the document application needs to first authenticate the request. The document application responds to the request of the third-party application only after the authentication succeeds, and rejects access by the third-party application to unauthorized private document data in the document application. This can reduce a risk of leakage of private data of an object.

Figure 11:
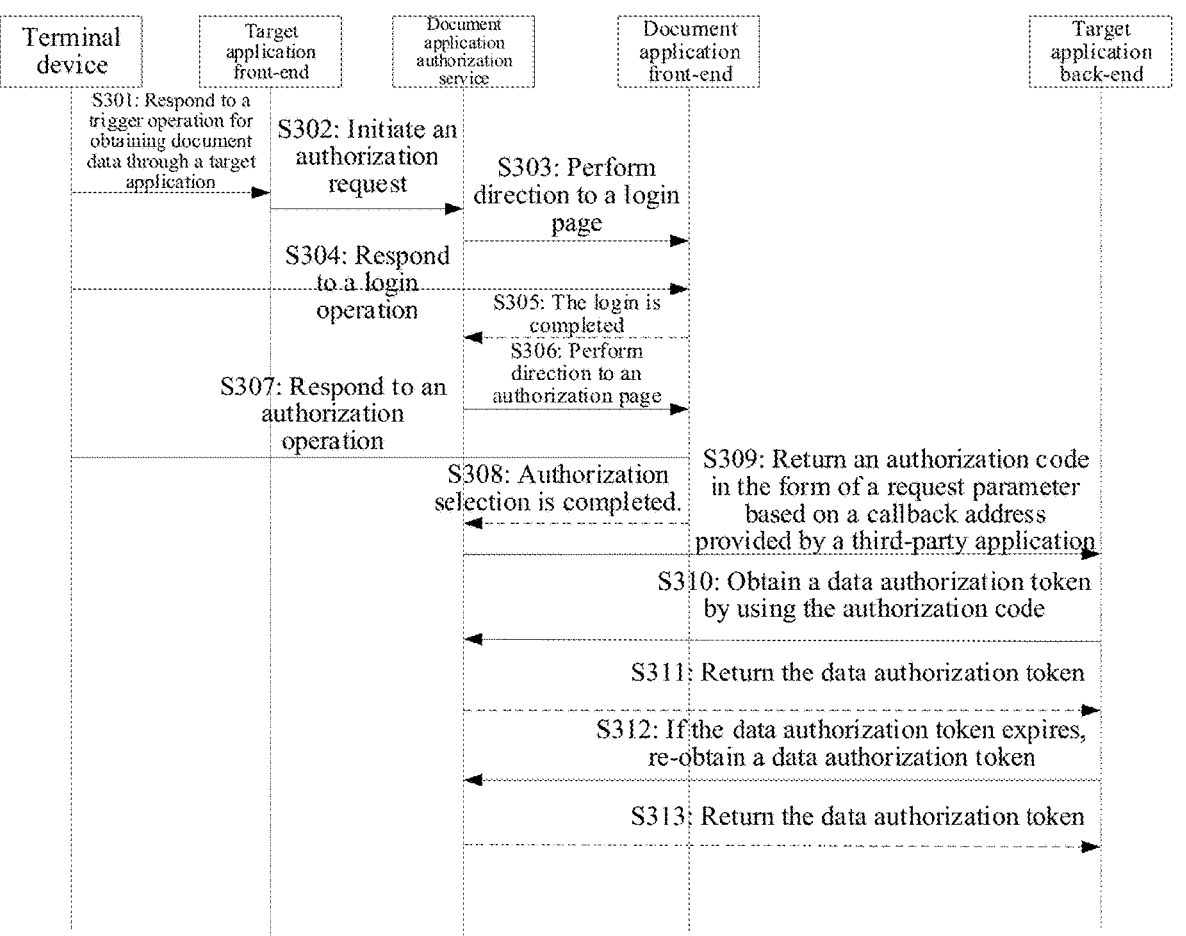
FIG. 11 is a schematic flowchart of authorizing a document by an object according to an embodiment of the present disclosure.

Further, FIG. 11 is a schematic flowchart of authorizing a document by an object according to an embodiment of the present disclosure. An entire process of authorizing a document by an object involves a terminal device, a target application front-end, a document application authorization service, a document application front-end, and a target application back-end. The terminal device may be any terminal device shown in FIG. 1, for example, the terminal device 200*b*. The target application front-end may be a mini program, a native application (App) or Hypertext Markup Language 5 (H5) page. The target application front-end may be integrated and installed on the terminal device. The document application authorization service is configured to authorize document data and a document function interface. The document application authorization service may be provided by a document application server (namely, the document application server shown in FIG. 1). The document application front-end may be a mini program, a native App or H5 page. The document application front-end may be integrated and installed on the terminal device. The target application back-end may be a target application server (namely, the target application server shown in FIG. 1). A document is authorized in an authorization code mode based on OAuth 2.0. As shown in FIG. 11, the entire process of authorizing a document by an object may include the following operations:

S301: The terminal device responds to a trigger operation for obtaining document data through a target application.

Specifically, a target object associated with the terminal device may perform, through the target application, a trigger operation for obtaining document data. The trigger operation for obtaining document data may be the trigger operation on the document source control in S101.

S302: The target application front-end initiates an authorization request to the document application authorization service.

S303: The document application authorization service receives the authorization request and indicates the document application front-end to jump to a login page of a document application.

S304: The terminal device completes a login to the document application in response to a login operation on the login page.

Specifically, the target object may log in by using its own account in the document application, or log in by using someone else's account in the document application. This is not limited herein. An object associated with a logged-in account is the foregoing first object.

S305: The document application front-end notifies the document application authorization service that the login is completed.

S306: The document application authorization service receives a login completion notification and indicates the document application front-end to jump to an authorization page of the document application.

Specifically, the authorization page may include the to-be-authorized-document list in S102, and the to-be-authorized-document list may include document titles that respectively correspond to all documents stored by the first object in the document application.

S307: The terminal device responds to an authorization operation.

Specifically, the target object may select, from the to-be-authorized-document list, a scope of documents (namely, document data) that the target object wants to authorize. The authorization operation is the trigger operation on the to-be-authorized-document list in S103.

S308: The document application front-end notifies the document application authorization service that authorization selection is completed.

Specifically, the document application front-end may initiate an authorization request to the document application authorization service, and the authorization request carries a document that the target object selects and wants to authorize.

S309: The document application returns an authorization code to the target application back-end in the form of a request parameter based on a callback address provided by the target application.

S310: The target application back-end initiates, to the document application authorization service based on the authorization code, a request for obtaining a data authorization token (access token).

S311: The document application authorization service returns a data authorization token to the target application back-end.

Specifically, when returning the data authorization token, the document application further returns expiration time of the data authorization token, an object identifier, and other information.

S312: If the data authorization token expires, the target application back-end may re-obtain a data authorization token from the document application authorization service.

Specifically, the target application back-end may re-obtain a data authorization token through a token refresh interface.

S313: The document application server may transmit the data authorization token to the target application back-end again.

In the present disclosure, a granularity of a document permission of the document application in the target application is refined, and an object is allowed to authorize only a part of a document or a single document, or even only a part of document content. This protects data privacy and security of the object to the maximum extent.

Figure 12:
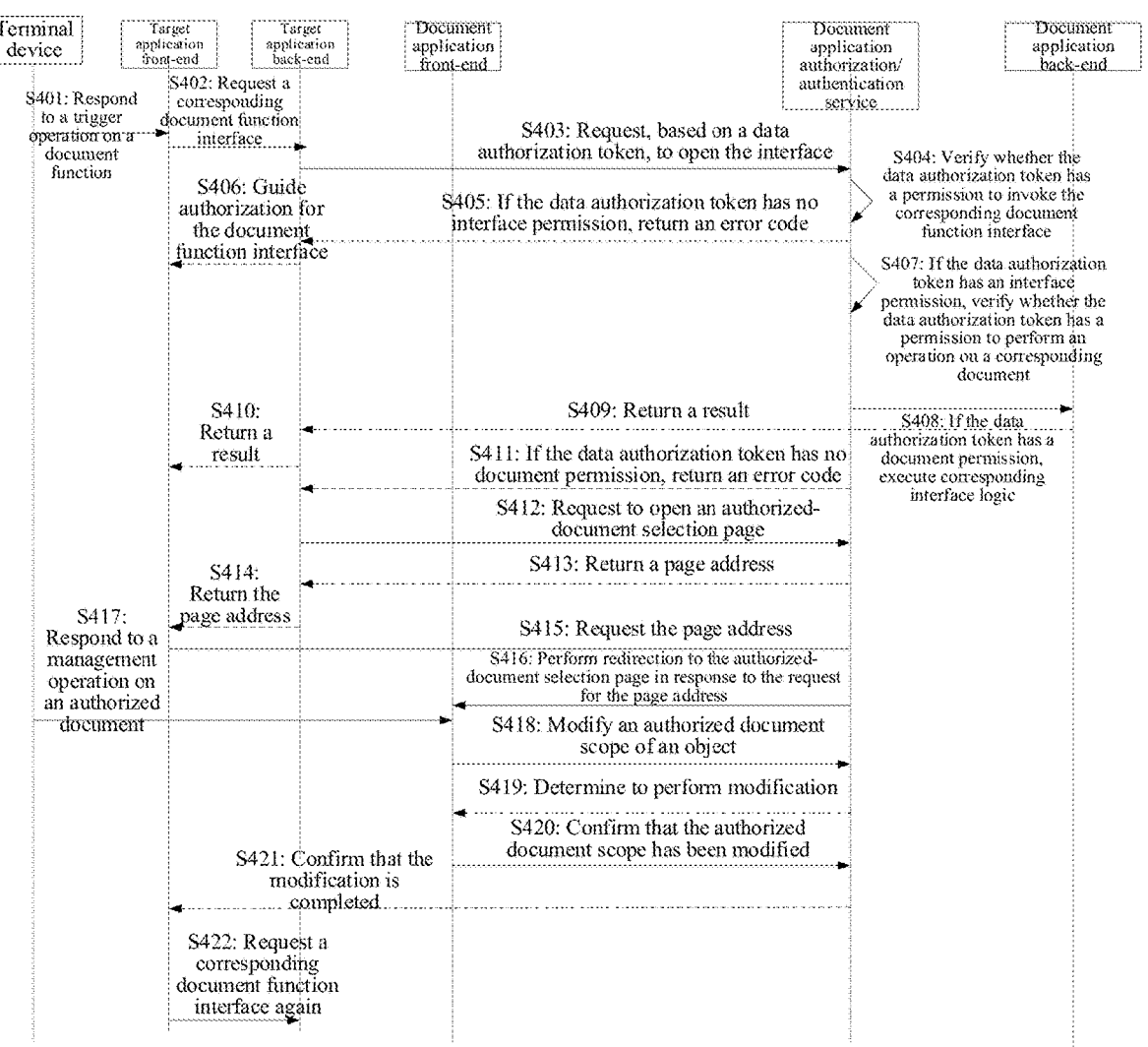
FIG. 12 is a schematic flowchart of invoking a document function according to an embodiment of the present disclosure.

Further, FIG. 12 is a schematic flowchart of invoking a document function according to an embodiment of the present disclosure. An entire process of invoking a document function may involve a terminal device, a target application front-end, a target application back-end, a document application front-end, a document application authorization/authentication service, and a document application back-end. The terminal device may be any terminal device shown in FIG. 1, for example, the terminal device 200*b*. The target application front-end may be a mini program, a native App or H5 page. The target application front-end may be integrated and installed on the terminal device. The target application back-end may be a target application server (namely, the target application server 100*a* shown in FIG. 1). The document application authorization/authentication service is configured to authorize and authenticate document data and a document function interface. The document application authorization/authentication service may be provided by a document application server (namely, the document application server shown in FIG. 1). The document application front-end may be a mini program, a native App or H5 page. The document application front-end may be integrated and installed on the terminal device. The document application back-end may be a document application server (namely, the document application server 100*b* shown in FIG. 1). A document is authorized in an authorization code mode based on OAuth 2.0. As shown in FIG. 12, the entire process of invoking a document function may include the following operations:

S401: The terminal device responds to a trigger operation on a document function.

Specifically, the trigger operation on the document function is to invoke a document function provided by the document application to perform document processing on specific document data, for example, the trigger operation on the first title in the first authorized-document list in S204 in the embodiment corresponding to FIG. 7.

S402: The target application front-end requests a corresponding document function interface from the target application back-end.

S403: The target application back-end initiates, to the document application authorization/authentication service based on a data authorization token, a request for opening the document function interface.

S404: The document application authorization/authentication service verifies whether the data authorization token has a permission to invoke the corresponding document function interface.

S405: If the document application authorization/authentication service determines that the data authorization token has no interface permission, to be specific, has no permission to invoke the corresponding document function interface, the document application authorization/authentication service returns an error code to the target application back-end.

S406: The target application back-end notifies the target application front-end that authentication fails, and the target application front-end may display a to-be-authorized-interface selection page to guide authorization for the document function interface.

Specifically, the to-be-authorized-interface selection page may include the to-be-authorized-function list in S202 in the embodiment corresponding to FIG. 7.

S407: If the document application authorization/authentication service determines that the data authorization token has an interface permission, the document application authorization/authentication service verifies whether the data authorization token has a permission to perform an operation on a corresponding document.

S408: If the document application authorization/authentication service determines that the data authorization token has a document permission, the document application authorization/authentication service indicates the document application back-end to execute corresponding interface logic.

Specifically, the corresponding interface logic is executed to implement a corresponding document function.

S409: The document application back-end obtains an execution result after executing the corresponding interface logic, and returns the execution result to the target application back-end.

S410: The target application back-end returns the execution result to the target application front-end, and the target application front-end displays a result based on the execution result.

S411: If the document application authorization/authentication service determines that the data authorization token has no document permission, the document application authorization/authentication service returns an error code to the target application back-end.

S412: The target application back-end initiates, to the document application authorization/authentication service based on the error code, a request for opening an authorized-document selection page.

S413: The document application authorization/authentication service returns, to the target application back-end, a page address corresponding to the authorized-document selection page.

Specifically, the page address may be a temporary link corresponding to the authorized-document selection page.

S414: The target application back-end returns, to the target application front-end, the page address corresponding to the authorized-document selection page.

S415: The target application back-end requests, from the document application authorization/authentication service, access to the page address corresponding to the authorized-document selection page.

S416: In response to the request for accessing the page address corresponding to the authorized-document selection page, the document application authorization/authentication service indicates the document application front-end to jump to the authorized-document selection page.

Specifically, only a document associated with a first object is displayed on the authorized-document selection page. The first object is an object that currently logs in to the document application.

S417: The terminal device responds to a management operation performed on an authorized document on the authorized-document selection page.

Specifically, the to-be-authorized-document list in the embodiment corresponding to FIG. 3 may be displayed on the authorized-document selection page, and an object may modify, based on the to-be-authorized-document list, an authorized document scope in a plurality of dimensions, for example, a document dimension (to be specific, the foregoing different document data) and a document content dimension (to be specific, the foregoing different sub-document data).

S418: The document application front-end initiates, to the document application authorization/authentication service, a request for modifying the authorized document scope of the object.

S419: The document application authorization/authentication service determines to modify the authorized document scope, and returns a modification confirmation result to the document application front-end.

S420: The document application front-end confirms that the authorized document scope has been modified.

S421: The document application authorization/authentication service notifies the target application front-end that the authorized document scope has been modified.

S422: The target application front-end may request a corresponding document function interface from the target application back-end again.

Embodiments of the present disclosure provide a method for authorizing a document permission scope when an object uses, in the target application, a document in the document application. In the method provided in embodiments of the present disclosure, privacy and security of document data of the object can be protected in a plurality of dimensions in a fine-grained manner. When the object uses the target application and needs to access a document of the object, the object may select a document scope or even a scope of a document content area to be authorized to the target application, without exposing all document information to the target application. This protects data privacy of the object to the maximum extent.

Figure 13:
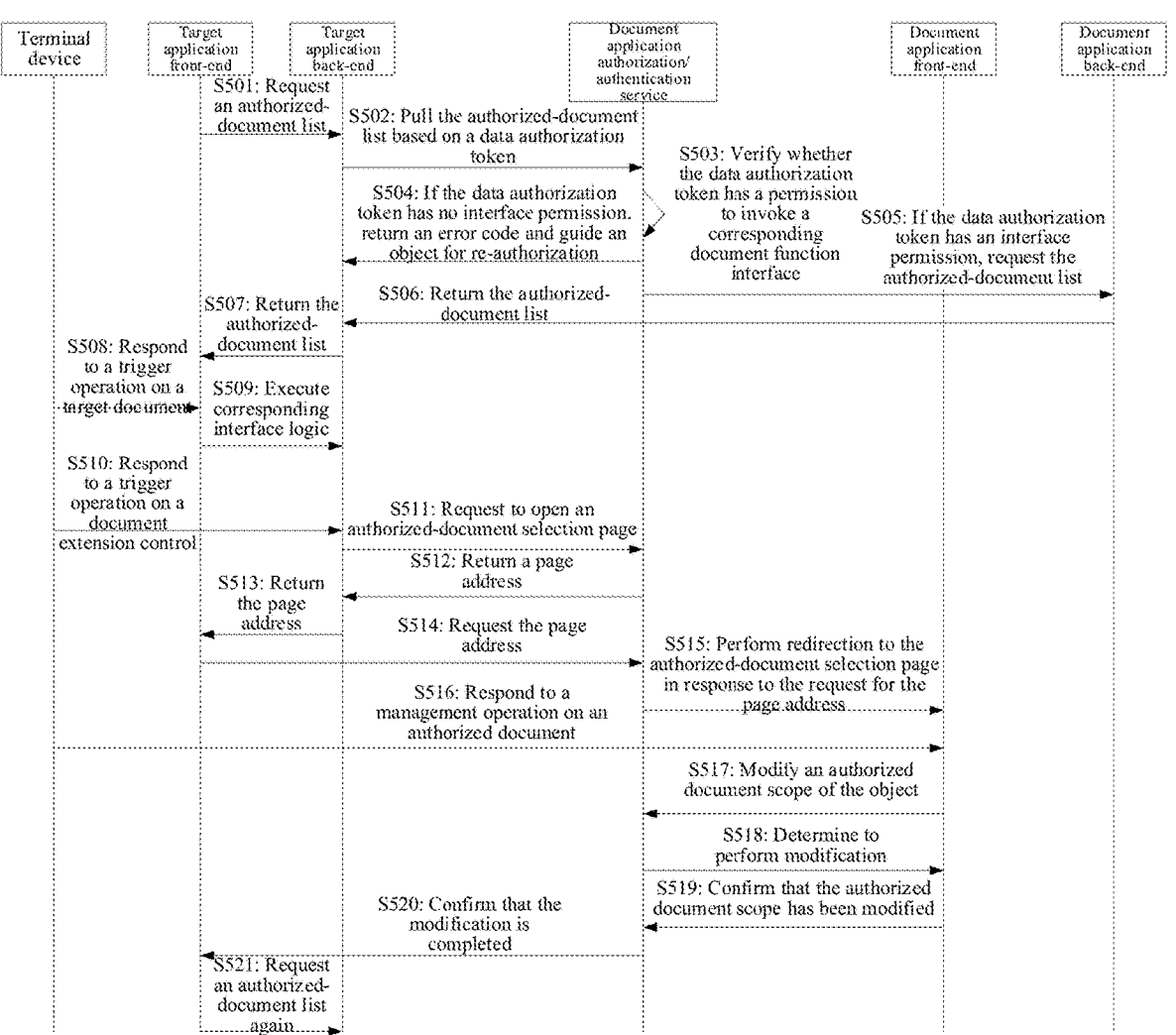
FIG. 13 is a schematic flowchart of obtaining an authorized-document list according to an embodiment of the present disclosure.

Further, FIG. 13 is a schematic flowchart of obtaining an authorized-document list according to an embodiment of the present disclosure. An entire process of obtaining an authorized-document list may involve a terminal device, a target application front-end, a target application back-end, a document application front-end, a document application authorization/authentication service, and a document application back-end. The terminal device may be any terminal device shown in FIG. 1, for example, the terminal device 200*b*. The target application front-end may be a mini program, a native App or H5 page. The target application front-end may be integrated and installed on the terminal device. The target application back-end may be a target application server (namely, the target application server 100*a* shown in FIG. 1). The document application authorization/authentication service is configured to authorize and authenticate document data and a document function interface. The document application authorization/authentication service may be provided by a document application server (namely, the document application server shown in FIG. 1). The document application front-end may be a mini program, a native App or H5 page. The document application front-end may be integrated and installed on the terminal device. The document application back-end may be a document application server (namely, the document application server 100*b* shown in FIG. 1). A document is authorized in an authorization code mode based on OAuth 2.0. As shown in FIG. 13, the entire process of obtaining an authorized-document list may include the following operations:

S501: The target application front-end initiates, to the target application back-end, a request for obtaining an authorized-document list.

S502: The target application back-end initiates, to the document application authorization/authentication service based on a data authorization token, a request for obtaining the authorized-document list.

S503: The document application authorization/authentication service verifies whether the data authorization token has a permission to invoke a corresponding document function interface.

S504: If the document application authorization/authentication service determines that the data authorization token has no interface permission, to be specific, has no permission to invoke the corresponding document function interface, the document application authorization/authentication service returns an error code to the target application back-end, and the target application back-end may re-guide, based on the error code, an object to authorization for the document function interface.

S505: If the document application authorization/authentication service determines that the data authorization token has an interface permission, the document application authorization/authentication service requests the authorized-document list from the document application back-end.

S506: The document application back-end returns the authorized-document list to the target application back-end.

S507: The target application back-end returns the authorized-document list to the target application front-end, and the target application front-end displays the authorized-document list.

S508: If the authorized-document list includes a document on which the object wants to perform an operation, the terminal device may respond to a trigger operation on a target document.

S509: The target application front-end may request the target application back-end to execute interface logic for the target document.

S510: If the authorized-document list does not include a document on which the object wants to perform an operation, the terminal device may transmit a document extension request to the target application back-end in response to a trigger operation on a document extension control.

Specifically, the document extension control may be the authorized-document extension control in the embodiment corresponding to FIG. 3.

S511: The target application back-end may initiate, to the document application authorization/authentication service based on the document extension request transmitted by the terminal device, a request for opening an authorized-document selection page.

S512: The document application authorization/authentication service returns, to the target application back-end, a page address corresponding to the authorized-document selection page.

Specifically, the page address may be a temporary link corresponding to the authorized-document selection page.

S513: The target application back-end returns, to the target application front-end, the page address corresponding to the authorized-document selection page.

S514: The target application back-end requests, from the document application authorization/authentication service, access to the page address corresponding to the authorized-document selection page.

S515: In response to the request for accessing the page address corresponding to the authorized-document selection page, the document application authorization/authentication service indicates the document application front-end to jump to the authorized-document selection page.

Specifically, only a document associated with a first object is displayed on the authorized-document selection page. The first object is an object that currently logs in to the document application.

S516: The terminal device responds to a management operation performed on an authorized document on the authorized-document selection page.

Specifically, the to-be-authorized-document list in the embodiment corresponding to FIG. 3 may be displayed on the authorized-document selection page, and an object may modify, based on the to-be-authorized-document list, an authorized document scope in a plurality of dimensions, for example, a document dimension (to be specific, the foregoing different document data) and a document content dimension (to be specific, the foregoing different sub-document data).

S517: The document application front-end initiates, to the document application authorization/authentication service, a request for modifying the authorized document scope of the object.

S518: The document application authorization/authentication service determines to modify the authorized document scope, and returns a modification confirmation result to the document application front-end.

S519: The document application front-end confirms that the authorized document scope has been modified.

S520: The document application authorization/authentication service notifies the target application front-end that the authorized document scope has been modified.

S521: The target application front-end may initiate, to the target application back-end, a request for obtaining an authorized-document list again.

In the present disclosure, an occasion of performing document authorization by the document application in the target application is modified, and document authorization is triggered only when an object accesses and uses a corresponding document. This can more effectively protect data privacy and security of a user. In addition, the present disclosure supports real-time dynamic incremental document authorization. To be specific, an object can be authorized at any time when the object uses a document, and does not need to be authorized if the object does not use a document. This protects data privacy and security of a user to the maximum extent.

Figure 14:
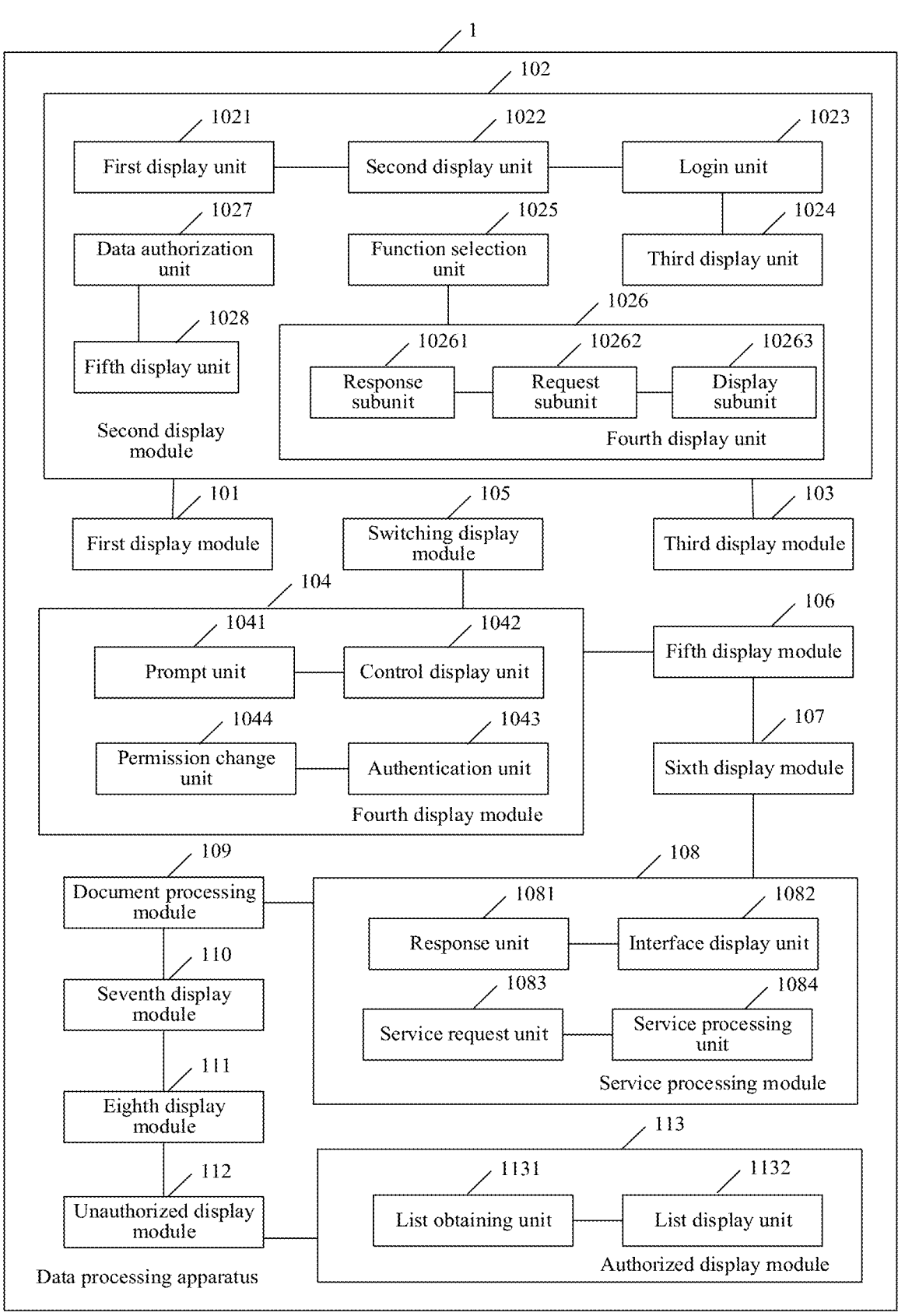
FIG. 14 is a schematic structural diagram of a data processing apparatus according to an embodiment of the present disclosure.

FIG. 14 is a schematic structural diagram of a data processing apparatus according to an embodiment of the present disclosure. The data processing apparatus may be a computer program (including program code) that is run on a computer device. For example, the data processing apparatus is application software. The apparatus may be configured to perform corresponding operations in the data processing method provided in embodiments of the present disclosure. As shown in FIG. 14, the data processing apparatus 1 may include a first display module 101, a second display module 102, and a third display module 103.

The first display module 101 is configured to display a document source control in a target application.

The second display module 102 is configured to display a to-be-authorized-document list in response to a display trigger operation on the document source control, the to-be-authorized-document list including one or more document titles, the one or more document titles including a title that is in a document application and that corresponds to document data associated with a first object, and the first object being an object that has logged in to the document application through the target application.

The third display module 103 is configured to display a first authorized-document list including a first title in response to an authorization trigger operation on the first title in the to-be-authorized-document list, the first title being a document title that is in the to-be-authorized-document list and that is triggered by the authorization trigger operation, and the authorization trigger operation granting the target application a permission to perform service processing on document data corresponding to the first title.

For specific functional implementations of the first display module 101, the second display module 102, and the third display module 103, refer to the descriptions of S101 to S103 in the embodiment corresponding to FIG. 3. Details are not described herein again.

The first authorized-document list further includes an unauthorized-document title. The first authorized-document list further includes an unauthorized-document title. The unauthorized-document title is a document title in the one or more document titles other than the first title. A display style of the first title is a selected style, and a display style of the unauthorized-document title is an unselected style. The target application has no permission to perform service processing on document data corresponding to the unauthorized-document title.

The data processing apparatus 1 further includes a fourth display module 104 and a switching display module 105.

The fourth display module 104 is configured to display, in response to a control display trigger operation on the unauthorized-document title in the first authorized-document list, a permission change control for a target title by using the triggered unauthorized-document title as the target title.

The switching display module 105 is configured to switch a display style of the target title from an unselected style to a selected style in response to a switching trigger operation on the permission change control, and use the target title as a new authorized-document title, the switching trigger operation granting the target application a permission to perform service processing on document data corresponding to the new authorized-document title.

For specific functional implementations of the fourth display module 104 and the switching display module 105, refer to the descriptions of S103 in the embodiment corresponding to FIG. 3. Details are not described herein again.

The fourth display module 104 includes a prompt unit 1041 and a control display unit 1042.

The prompt unit 1041 is configured to display, in response to a first display trigger suboperation on the unauthorized-document title in the first authorized-document list, an error prompt box associated with a target title by using the triggered unauthorized-document title as the target title, the error prompt box including permission error prompt information and a permission change guide control, and the permission error prompt information indicating that the target application has no permission to perform service processing on document data corresponding to the target title.

The control display unit 1042 is configured to display a permission change control for the target title in response to a second display trigger suboperation on the permission change guide control.

For specific functional implementations of the prompt unit 1041 and the control display unit 1042, refer to the descriptions of S103 in the embodiment corresponding to FIG. 3. Details are not described herein again.

The first authorized-document list further includes an unauthorized-document extension control; and the data processing apparatus 1 further includes a fifth display module 106.

The fifth display module 106 is configured to display an authorized-document extension list in response to an extension list trigger operation on the authorized-document extension control, the authorized-document extension list including an unauthorized-document title, and the unauthorized-document title being a document title in the one or more document titles other than the first title.

The fifth display module 106 is further configured to display, in response to a document title trigger operation on the unauthorized-document title in the authorized-document extension list, an extended authorized-document title in a blank area of the first authorized-document list by using the triggered unauthorized-document title as the extended authorized-document title, the document title trigger operation granting the target application a permission to perform service processing on document data corresponding to the extended authorized-document title.

For specific functional implementations of the fifth display module 106, refer to the descriptions of S103 in the embodiment corresponding to FIG. 3. Details are not described herein again.

The first authorized-document list further includes an authorized-document cancellation control; and the data processing apparatus 1 further includes a sixth display module 107.

The sixth display module 107 is configured to display an authorized-document cancellation list in response to a cancellation list trigger operation on the authorized-document cancellation control, the authorized-document cancellation list including the first title.

The sixth display module 107 is further configured to cancel, in response to a display cancellation trigger operation on the first title in the authorized-document cancellation list, display of an unauthorized-document title in the first authorized-document list by using the triggered first title as the unauthorized-document title, the display cancellation trigger operation enabling the target application to have no permission to perform service processing on document data corresponding to the unauthorized-document title.

For specific functional implementations of the sixth display module 107, refer to the descriptions of S103 in the embodiment corresponding to FIG. 3. Details are not described herein again.

The data processing apparatus 1 further includes a service processing module 108.

The service processing module 108 is configured to perform, in response to an authorized-document trigger operation on the first title in the first authorized-document list, service processing on target document data by using the triggered first title as a target authorized-document title and using document data corresponding to the target authorized-document title as the target document data, and display a service processing result.

For specific functional implementations of the service processing module 108, refer to the descriptions of S203 in the embodiment corresponding to FIG. 7. Details are not described herein again.

In a case that the authorized-document trigger operation on the first title includes a document function trigger operation, the service processing module 108 includes a response unit 1081 and an interface display unit 1082.

The response unit 1081 is configured to respond to the document function trigger operation on the first title in the first authorized-document list, use the triggered first title as the target authorized-document title, and use the document data corresponding to the target authorized-document title as the target document data.

The interface display unit 1082 is configured to jump to the document application, and display a document browsing interface in the document application, the document browsing interface including the target document data.

For specific functional implementations of the response unit 1081 and the interface display unit 1082, refer to the descriptions of S203 in the embodiment corresponding to FIG. 7. Details are not described herein again.

The document browsing interface further includes a document function control; and the data processing apparatus 1 further includes a document processing module 109.

The document processing module 109 is configured to perform document processing on the target document data in response to a document processing trigger operation on the document function control, and display target document data obtained through document processing on the document browsing interface.

For specific functional implementations of the document processing module 109, refer to the descriptions of S203 in the embodiment corresponding to FIG. 7. Details are not described herein again.

The second display module 102 includes a first display unit 1021 and a second display unit 1022.

The first display unit 1021 is configured to display an authorization scope selection list in response to the display trigger operation on the document source control, the authorization scope selection list including a local-scope authorization control.

The second display unit 1022 is configured to display the to-be-authorized-document list in response to an authorization trigger operation on the local-scope authorization control.

For specific functional implementations of the first display unit 1021 and the second display unit 1022, refer to the descriptions of S102 in the embodiment corresponding to FIG. 3. Details are not described herein again.

The authorization scope selection list further includes a global-scope authorization control; and the data processing apparatus 1 further includes a seventh display module 110.

The seventh display module 110 is configured to: in response to an authorization list trigger operation on the global-scope authorization control, display a second authorized-document list including a global authorized-document title, the global authorized-document title including a title that is in the document application and that corresponds to each piece of document data associated with the first object.

For specific functional implementations of the seventh display module 110, refer to the descriptions of S102 in the embodiment corresponding to FIG. 3. Details are not described herein again.

The second display module 102 includes a login unit 1023 and a third display unit 1024.

The login unit 1023 is configured to display an account login page corresponding to the document application in response to the display trigger operation on the document source control.

The login unit 1023 is further configured to: in response to an account login operation on the account login page, use, as the first object, an object associated with an account that has logged in.

The third display unit 1024 is configured to display a to-be-authorized-document list that includes one or more document titles associated with the first object.

For specific functional implementations of the login unit 1023 and the third display unit 1024, refer to the descriptions of S102 in the embodiment corresponding to FIG. 3. Details are not described herein again.

The data processing apparatus 1 further includes an eighth display module 111.

The eighth display module 111 is configured to: if document data corresponding to an intermediate authorized-document title includes at least two pieces of sub-document data, display a sub-document authorization list for the intermediate authorized-document title, the sub-document authorization list including a select-all control and sub-document titles respectively corresponding to the at least two pieces of sub-document data, and the intermediate authorized-document title being a document title that is triggered in the to-be-authorized-document list and that has not been added to the first authorized-document list.

The eighth display module 111 is further configured to: in response to a select-all trigger operation on the select-all control, determine the intermediate authorized-document title as the first title, and perform the operation of displaying a first authorized-document list including a first title.

The eighth display module 111 is further configured to: in response to a local trigger operation on at least two sub-document titles in the sub-document authorization list, display a third authorized-document list including a local authorized-document title by using the intermediate authorized-document title as the local authorized-document title and using sub-document data corresponding to the triggered sub-document titles as document data corresponding to the local authorized-document title, the local trigger operation granting the target application a permission to perform service processing on the document data corresponding to the local authorized-document title.

For specific functional implementations of the eighth display module 111, refer to the descriptions S102 in the embodiment corresponding to FIG. 3. Details are not described herein again.

The data processing apparatus 1 further includes an unauthorized display module 112 and an authorized display module 113.

The unauthorized display module 112 is configured to invoke the second display module if a document authorization status of the first object in the target application is an unauthorized state, the document authorization status being switched to an authorized state when the first authorized-document list is generated.

The authorized display module 113 is configured to display the first authorized-document list in response to a source trigger operation on the document source control if the target application is restarted and the document authorization status of the first object in the target application is the authorized state.

For specific functional implementations of the unauthorized display module 112 and the authorized display module 113, refer to the descriptions of S201 to S205 in the embodiment corresponding to FIG. 7. Details are not described herein again.

The second display module 102 includes a function selection unit 1025 and a fourth display unit 1026.

The function selection unit 1025 is configured to display a to-be-authorized function list in response to the display trigger operation on the document source control, the to-be-authorized function list including one or more document permission controls, and one document permission control being associated with one document function interface corresponding to the document application.

The fourth display unit 1026 is configured to display, in response to a permission trigger operation on the one or more document permission controls, a to-be-authorized-document list associated with an authorized document function interface by using the triggered document permission control as an authorized permission control, the authorized document function interface being a document function interface associated with the authorized permission control, and the permission trigger operation granting the target application a permission to invoke the authorized document function interface through the document application.

For specific functional implementations of the function selection unit 1025 and the fourth display unit 1026, refer to the descriptions of S202 in the embodiment corresponding to FIG. 7. Details are not described herein again.

The fourth display unit 1026 includes a response subunit 10261, a request subunit 10262, and a display subunit 10263.

The response subunit 10261 is configured to use the triggered document permission control as the authorized permission control in response to the permission trigger operation on the one or more document permission controls.

The request subunit 10262 is configured to generate a permission opening request for the authorized document function interface, and transmit the permission opening request to a document application server, so that the document application server performs permission opening for the authorized document function interface to obtain a permission grant result.

The display subunit 10263 is configured to: if the permission grant result transmitted by the document application server is received, display the to-be-authorized-document list associated with the authorized document function interface.

For specific functional implementations of the response subunit 10261, the request subunit 10262, and the display subunit 10263, refer to the descriptions of S202 in the embodiment corresponding to FIG. 7. Details are not described herein again.

The second display module 102 includes a data authorization unit 1027 and a fifth display unit 1028.

The data authorization unit 1027 is configured to use a triggered document title as the first title in response to the authorization trigger operation on the to-be-authorized-document list.

The data authorization unit 1027 is further configured to generate a data authorization request based on the first title, and transmit the data authorization request to the document application server, so that the document application server performs data authorization on the first title based on the data authorization request to obtain a data authorization token for the first title and transmits the data authorization token to a target application server, the data authorization token being associated with the first title and an authorized document function interface and being configured for obtaining a permission for the target application to invoke the authorized document function interface through the document application.

The fifth display unit 1028 is configured to: if authorization acknowledgement information transmitted by the target application server is received, display the first authorized-document list including the first title, the authorization acknowledgement information being information generated after the target application server stores the data authorization token.

For specific functional implementations of the data authorization unit 1027 and the fifth display unit 1028, refer to the descriptions of operation 203 in the embodiment corresponding to FIG. 7. Details are not described herein again.

The authorized display module 113 includes a list obtaining unit 1131 and a list display unit 1132.

The list obtaining unit 1131 is configured to: if the target application is restarted, in response to the source trigger operation on the document source control, generate a list obtaining request, and transmit the list obtaining request to the target application server, so that the target application server generates a permission verification request based on the list obtaining request and a data authorization token associated with the first object and transmits the permission verification request to the document application server, the data authorization token being obtained by the document application server by performing data authorization on the first title.

The list display unit 1132 is configured to: if the first title transmitted by the document application server is received, determine that the document authorization status of the first object in the target application is the authorized state, and display the first authorized-document list, the first title being obtained based on the data authorization token when the document application server determines, based on the permission verification request, that the data authorization token is associated with an authorized document function interface.

For specific functional implementations of the list obtaining unit 1131 and the list display unit 1132, refer to the descriptions of S205 in the embodiment corresponding to FIG. 7. Details are not described herein again.

The service processing module 108 includes a service request unit 1083 and a service processing unit 1084.

The service request unit 1083 is configured to: in response to the authorized-document trigger operation on the first title in the first authorized-document list, by using the triggered first title as the target authorized-document title, generate a first service request for the target authorized-document title, and transmit the first service request to the target application server, so that the target application server generates a first service permission verification request based on the first service request and transmits the first service permission verification request to the document application server, the first service permission verification request including a data authorization token, a target to-be-invoked document function interface, and the target authorized-document title, the data authorization token being generated by the document application server by performing data authorization on the first title, and the target to-be-invoked document function interface being a document function interface that needs to be invoked in response to a trigger operation on the first title.

The service processing unit 1084 is configured to: if permission verification success information transmitted by the target application server is received, perform service processing on the target document data by using the document data corresponding to the target authorized-document title as the target document data, and display a service processing result, the permission verification success information being generated by the target application server after receiving an authentication success result transmitted by the document application server, and the authentication success result being generated by the document application server when determining, based on the first service permission verification request, that an authorized document function interface associated with the data authorization token includes the target to-be-invoked document function interface and that an authorized-document title associated with the data authorization token includes the target authorized-document title.

For specific functional implementations of the service request unit 1083 and the service processing unit 1084, refer to the descriptions of S204 in the embodiment corresponding to FIG. 7. Details are not described herein again.

The fourth display module 104 includes an authentication unit 1043 and a permission change unit 1044.

The authentication unit 1043 is configured to: in response to the control display trigger operation on the unauthorized-document title in the first authorized-document list, by using the triggered unauthorized-document title as the target title, generate a second service request for the target title, and transmit the second service request to the target application server, so that the target application server generates a second service permission verification request based on the second service request and transmits the second service permission verification request to the document application server, the second service permission verification request including a data authorization token, a target to-be-invoked document function interface, and the target title, the data authorization token being generated by the document application server by performing data authorization on the first title, and the target to-be-invoked document function interface being a document function interface that needs to be invoked in response to a trigger operation on the unauthorized-document title.

The permission change unit 1044 is configured to: if permission verification failure information transmitted by the target application server is received, display a permission change control for the target title, the permission verification failure information being generated by the target application server after receiving error code information transmitted by the document application server, and the error code information being generated by the document application server when determining, based on the second service permission verification request, that an authorized document function interface associated with the data authorization token includes the target to-be-invoked document function interface and that an authorized-document title associated with the data authorization token does not include the target title.

For specific functional implementations of the authentication unit 1043 and the permission change unit 1044, refer to the descriptions of S204 in the embodiment corresponding to FIG. 7. Details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 15:
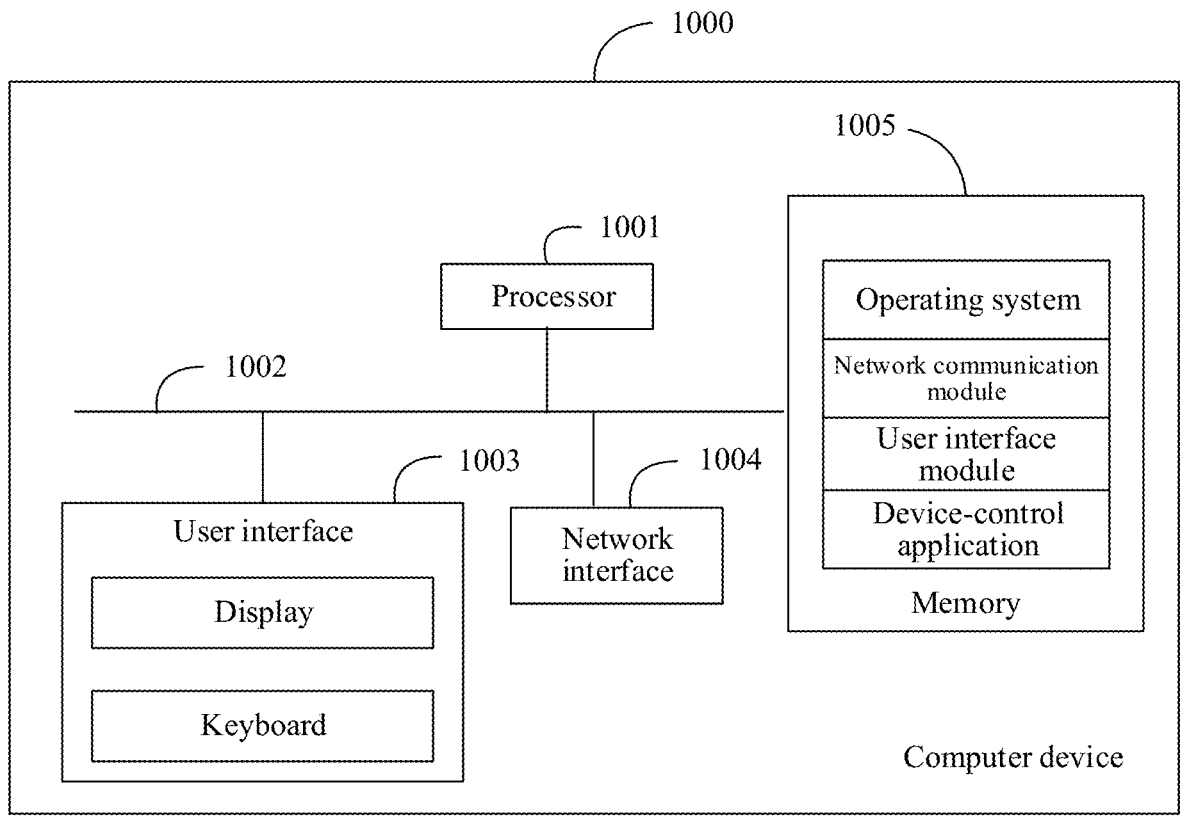
FIG. 15 is a schematic structural diagram of a computer device according to an embodiment of the present disclosure.

FIG. 15 is a schematic structural diagram of a computer device according to an embodiment of the present disclosure. As shown in FIG. 15, the data processing apparatus 1 in the embodiment corresponding to FIG. 14 may be applied to a computer device 1000, and the computer device 1000 may include a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. In some embodiments, the user interface 1003 may further include a standard wired interface and a standard wireless interface. In some embodiments, the network interface 1004 may include a standard wired interface and wireless interface (for example, a Wi-Fi interface). The memory 1005 may be a high-speed RAM memory, or may be a non-volatile memory, for example, at least one magnetic disk memory. In some embodiments, the memory 1005 may be at least one storage apparatus located away from the processor 1001. As shown in FIG. 15, the memory 1005 used as a computer-readable storage medium may include an operating system, a network communication module, a user interface module, and a device-control application.

In the computer device 1000 shown in FIG. 15, the network interface 1004 may provide a network communication network element, the user interface 1003 is mainly configured to provide an input interface for a user, and the processor 1001 may be configured to invoke the device-control application stored in the memory 1005 to implement the following operations:

displaying a document source control in a target application;

displaying a to-be-authorized-document list in response to a display trigger operation on the document source control, the to-be-authorized-document list including one or more document titles, the one or more document titles including a title that is in a document application and that corresponds to document data associated with a first object, and the first object being an object that has logged in to the document application through the target application; and displaying a first authorized-document list including a first title in response to an authorization trigger operation on the first title in the to-be-authorized-document list, the first title being a document title that is in the to-be-authorized-document list and that is triggered by the authorization trigger operation, and the authorization trigger operation granting the target application a permission to perform service processing on document data corresponding to the first title.

The computer device 1000 described in this embodiment of the present disclosure may perform the descriptions of the data processing method in the embodiment corresponding to FIG. 3. Details are not described herein again. In addition, beneficial effects of the same method are not described herein again either.

In addition, embodiments of the present disclosure further provide a computer-readable storage medium, and the computer-readable storage medium stores a computer program to be executed by the foregoing data processing apparatus 1. When the computer program is executed by a processor, the descriptions of the data processing method in the embodiment corresponding to either of FIG. 3 and FIG. 7 can be performed. Therefore, details are not described herein again. In addition, beneficial effects of the same method are not described herein again either. For technical details that are not disclosed in the embodiment of the computer-readable storage medium in the present disclosure, refer to the descriptions of the method embodiments of the present disclosure.

Embodiments of the present disclosure further provide a computer program product including a computer program. When the computer program product is run on a computer, the computer is enabled to perform the method provide in the foregoing embodiments.

The computer-readable storage medium may be an internal storage unit of the data processing apparatus provided in any one of the foregoing embodiments or the computer device in any one of the foregoing embodiments, for example, a hard disk drive or a memory of the computer device. Alternatively, the computer-readable storage medium may be an external storage device of the computer device, for example, a plug-in hard disk, a smart media card (SMC), a secure digital (SD) card, a flash card, or the like that is configured on the computer device. Further, the computer-readable storage medium may alternatively include both an internal storage unit of the computer device and an external storage device. The computer-readable storage medium is configured to store the computer program and other programs and data that are required by the computer device. The computer-readable storage medium may be further configured to temporarily store data that has been output or is to be output.

In addition, embodiments of the present disclosure further provide a computer program product or a computer program. The computer program product or the computer program includes computer instructions, and the computer instructions are stored in a computer-readable storage medium. A processor of a computer device reads the computer instructions from the computer-readable storage medium, and the processor executes the computer instructions, so that the computer device performs the method provided in the embodiment corresponding to either of FIG. 3 and FIG. 7.

In the specification, claims, and accompanying drawings of embodiments of the present disclosure, the terms "first", "second", and the like are merely intended to distinguish between different objects but do not indicate a particular order. In addition, the term "include" and any variants thereof are intended to cover a non-exclusive inclusion. For example, a process, a method, an apparatus, a product, or a device that includes a series of operations or units is not limited to the listed operations or modules, and in some embodiments, further includes other unlisted operations or modules, or further includes other inherent operations or units of the process, the method, the apparatus, the product, or the device.

A person of ordinary skill in the art may be aware that, in combination with the examples described in embodiments disclosed in this specification, units and algorithm operations can be implemented by electronic hardware, computer software, or a combination thereof. To clearly describe interchangeability between hardware and software, the foregoing generally describes compositions and operations of the examples based on network elements. Whether the network elements are executed by hardware or software depends on particular applications and design constraints of technical solutions. A person skilled in the art may use different methods to implement the described network elements for each particular application, but it is not to be considered that the implementation goes beyond the scope of the present disclosure.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A data processing method, the method being performed by a computer device, and the method comprising:

displaying a document source control in a target application;

displaying an authorization scope selection list in response to a display trigger operation on the document source control, the authorization scope selection list comprising a local-scope authorization control;

displaying a to-be-authorized-document list in response to an authorization trigger operation on the local-scope authorization control, the to-be-authorized-document list comprising one or more document titles, the one or more document titles comprising a title that is in a document application and that corresponds to document data associated with a first object, and the first object being logged in to the document application through the target application;

displaying a first authorized-document list comprising a first title in response to an authorization trigger operation on the first title in the to-be-authorized-document list, the authorization trigger operation granting the target application a permission to perform service processing on document data corresponding to the first title; and performing, in response to an authorized-document trigger operation on the first title in the first authorized-document list, service processing on target document data by using the triggered first title as a target authorized-document title and using document data corresponding to the target authorized-document title as the target document data, and displaying a service processing result.

2. The method according to claim 1, wherein the first authorized-document list further comprises an unauthorized-document title, the unauthorized-document title is a document title in the one or more document titles other than the first title, a display style of the first title is a selected style, a display style of the unauthorized-document title is an unselected style, the target application has no permission to perform service processing on document data corresponding to the unauthorized-document title, and the method further comprises:

displaying, in response to a control display trigger operation on the unauthorized-document title in the first authorized-document list, a permission change control for a target title by using the triggered unauthorized-document title as the target title; and switching a display style of the target title from an unselected style to a selected style in response to a switching trigger operation on the permission change control, and using the target title as a new authorized-document title, the switching trigger operation granting the target application a permission to perform service processing on document data corresponding to the new authorized-document title.

3. The method according to claim 2, wherein the displaying, in response to the control display trigger operation on the unauthorized-document title in the first authorized-document list, the permission change control for the target title by using the triggered unauthorized-document title as the target title comprises:

displaying, in response to a first display trigger suboperation on the unauthorized-document title in the first authorized-document list, an error prompt box associated with a target title by using the triggered unauthorized-document title as the target title, the error prompt box comprising permission error prompt information and a permission change guide control, and the permission error prompt information indicating that the target application has no permission to perform service processing on document data corresponding to the target title; and displaying a permission change control for the target title in response to a second display trigger suboperation on the permission change guide control.

4. The method according to claim 1, wherein the first authorized-document list further comprises an authorized-document extension control; and the method further comprises:

displaying an authorized-document extension list in response to an extension list trigger operation on the authorized-document extension control, the authorized-document extension list comprising an unauthorized-document title, and the unauthorized-document title being a document title in the one or more document titles other than the first title; and displaying, in response to a document title trigger operation on the unauthorized-document title in the authorized-document extension list, an extended authorized-document title in a blank area of the first authorized-document list by using the triggered unauthorized-document title as the extended authorized-document title, the document title trigger operation granting the target application a permission to perform service processing on document data corresponding to the extended authorized-document title.

5. The method according to claim 1, wherein the first authorized-document list further comprises an authorized-document cancellation control; and the method further comprises:

displaying an authorized-document cancellation list in response to a cancellation list trigger operation on the authorized-document cancellation control, the authorized-document cancellation list comprising the first title; and canceling, in response to a display cancellation trigger operation on the first title in the authorized-document cancellation list, display of an unauthorized-document title in the first authorized-document list by using the triggered first title as the unauthorized-document title, the display cancellation trigger operation enabling the target application to have no permission to perform service processing on document data corresponding to the unauthorized-document title.

6. The method according to claim 1, wherein the authorized-document trigger operation on the first title comprises a document function trigger operation, and the performing, in response to an authorized-document trigger operation on the first title in the first authorized-document list, service processing on target document data by using the triggered first title as a target authorized-document title and using document data corresponding to the target authorized-document title as the target document data, and displaying a service processing result comprises:

in response to the document function trigger operation on the first title in the first authorized-document list, by using the triggered first title as the target authorized-document title and using the document data corresponding to the target authorized-document title as the target document data, jumping to the document application, and displaying a document browsing interface in the document application, the document browsing interface comprising the target document data.

7. The method according to claim 6, wherein the document browsing interface further comprises a document function control; and the method further comprises:

performing document processing on the target document data in response to a document processing trigger operation on the document function control, and displaying target document data obtained through document processing on the document browsing interface.

8. The method according to claim 1, wherein the authorization scope selection list further comprises a global-scope authorization control; and the method further comprises:

in response to an authorization list trigger operation on the global-scope authorization control, displaying a second authorized-document list comprising a global authorized-document title, the global authorized-document title comprising a title that is in the document application and that corresponds to each piece of document data associated with the first object.

9. The method according to claim 1, further comprising:

in response to that document data corresponding to an intermediate authorized-document title comprises at least two pieces of sub-document data, displaying a sub-document authorization list for the intermediate authorized-document title, the sub-document authorization list comprising a select-all control and sub-document titles respectively corresponding to the at least two pieces of sub-document data, and the intermediate authorized-document title being a document title that is triggered in the to-be-authorized-document list and that has not been added to the first authorized-document list;

in response to a select-all trigger operation on the select-all control, determining the intermediate authorized-document title as the first title, and performing the operation of displaying a first authorized-document list comprising a first title; and in response to a local trigger operation on at least two sub-document titles in the sub-document authorization list, displaying a third authorized-document list comprising a local authorized-document title by using the intermediate authorized-document title as the local authorized-document title and using sub-document data corresponding to the triggered sub-document titles as document data corresponding to the local authorized-document title, the local trigger operation granting the target application a permission to perform service processing on the document data corresponding to the local authorized-document title.

10. The method according to claim 1, further comprising:

in response to that a document authorization status of the first object in the target application is an unauthorized state, performing the operation of displaying a to-be-authorized-document list in response to a display trigger operation on the document source control, the document authorization status being switched to an authorized state when the first authorized-document list is generated; and displaying the first authorized-document list in response to a source trigger operation on the document source control in response to that the target application is restarted and the document authorization status of the first object in the target application is the authorized state.

11. The method according to claim 1, further comprising:

displaying a to-be-authorized function list in response to the display trigger operation on the document source control, the to-be-authorized function list comprising one or more document permission controls, and one document permission control being associated with one document function interface corresponding to the document application; and displaying, in response to a permission trigger operation on the one or more document permission controls, the to-be-authorized-document list associated with an authorized document function interface by using the triggered document permission control as an authorized permission control, the authorized document function interface being a document function interface associated with the authorized permission control, and the permission trigger operation granting the target application a permission to invoke the authorized document function interface through the document application.

12. The method according to claim 11, wherein the displaying, in response to the permission trigger operation on the one or more document permission controls, the to-be-authorized-document list associated with the authorized document function interface by using the triggered document permission control as the authorized permission control comprises:

using the triggered document permission control as the authorized permission control in response to the permission trigger operation on the one or more document permission controls;

generating a permission opening request for the authorized document function interface, and transmitting the permission opening request to a document application server, so that the document application server performs permission opening for the authorized document function interface to obtain a permission grant result; and in response to that the permission grant result transmitted by the document application server is received, displaying the to-be-authorized-document list associated with the authorized document function interface.

13. The method according to claim 1, wherein the displaying the first authorized-document list comprising the first title in response to the authorization trigger operation on the first title in the to-be-authorized-document list comprises:

using a triggered document title as the first title in response to the authorization trigger operation on the to-be-authorized-document list;

generating a data authorization request based on the first title, and transmitting the data authorization request to the document application server, so that the document application server performs data authorization on the first title based on the data authorization request to obtain a data authorization token for the first title and transmits the data authorization token to a target application server, the data authorization token being associated with the first title and an authorized document function interface and being configured for obtaining a permission for the target application to invoke the authorized document function interface through the document application; and in response to that authorization acknowledgement information transmitted by the target application server is received, displaying the first authorized-document list comprising the first title, the authorization acknowledgement information being information generated after the target application server stores the data authorization token.

14. The method according to claim 10, wherein the displaying the first authorized-document list in response to the source trigger operation on the document source control in response to that the target application is restarted and the document authorization status of the first object in the target application is the authorized state comprises:

after the target application is restarted, in response to the source trigger operation on the document source control, generating a list obtaining request, and transmitting the list obtaining request to the target application server, so that the target application server generates a permission verification request based on the list obtaining request and a data authorization token associated with the first object and transmits the permission verification request to the document application server, the data authorization token being obtained by the document application server by performing data authorization on the first title; and in response to that the first title transmitted by the document application server is received, determining that the document authorization status of the first object in the target application is the authorized state, and displaying the first authorized-document list, the first title being obtained based on the data authorization token when the document application server determines, based on the permission verification request, that the data authorization token is associated with an authorized document function interface.

15. The method according to claim 1, wherein the performing, in response to the authorized-document trigger operation on the first title in the first authorized-document list, service processing on target document data by using the triggered first title as the target authorized-document title and using document data corresponding to the target authorized-document title as the target document data, and displaying the service processing result comprises:

in response to the authorized-document trigger operation on the first title in the first authorized-document list, by using the triggered first title as the target authorized-document title, generating a first service request for the target authorized-document title, and transmitting the first service request to the target application server, so that the target application server generates a first service permission verification request based on the first service request and transmits the first service permission verification request to the document application server, the first service permission verification request comprising a data authorization token, a target to-be-invoked document function interface, and the target authorized-document title, the data authorization token being generated by the document application server by performing data authorization on the first title, and the target to-be-invoked document function interface being a document function interface that needs to be invoked in response to a trigger operation on the first title; and in response to that permission verification success information transmitted by the target application server is received, performing service processing on the target document data by using the document data corresponding to the target authorized-document title as the target document data, and displaying a service processing result, the permission verification success information being generated by the target application server after receiving an authentication success result transmitted by the document application server, and the authentication success result being generated by the document application server when determining, based on the first service permission verification request, that an authorized document function interface associated with the data authorization token comprises the target to-be-invoked document function interface and that an authorized-document title associated with the data authorization token comprises the target authorized-document title.

16. The method according to claim 2, wherein the displaying, in response to the control display trigger operation on the unauthorized-document title in the first authorized-document list, a permission change control for a target title by using the triggered unauthorized-document title as the target title comprises:

in response to the control display trigger operation on the unauthorized-document title in the first authorized-document list, by using the triggered unauthorized-document title as the target title, generating a second service request for the target title, and transmitting the second service request to the target application server, so that the target application server generates a second service permission verification request based on the second service request and transmits the second service permission verification request to the document application server, the second service permission verification request comprising a data authorization token, a target to-be-invoked document function interface, and the target title, the data authorization token being generated by the document application server by performing data authorization on the first title, and the target to-be-invoked document function interface being a document function interface that needs to be invoked in response to a trigger operation on the unauthorized-document title; and in response to that permission verification failure information transmitted by the target application server is received, displaying a permission change control for the target title, the permission verification failure information being generated by the target application server after receiving error code information transmitted by the document application server, and the error code information being generated by the document application server when determining, based on the second service permission verification request, that an authorized document function interface associated with the data authorization token comprises the target to-be-invoked document function interface and that an authorized-document title associated with the data authorization token does not comprise the target title.

17. A data processing apparatus, comprising:
at least one processor, and at least one memory coupled to the at least one processor,
the at least one memory being configured to store computer code, and the at least one processor being configured to invoke the computer code to perform:
displaying a document source control in a target application;
displaying an authorization scope selection list in response to a display trigger operation on the document source control, the authorization scope selection list comprising a local-scope authorization control;
displaying a to-be-authorized-document list in response to an authorization trigger operation on the local-scope authorization control, the to-be-authorized-document list comprising one or more document titles, the one or more document titles comprising a title that is in a document application and that corresponds to document data associated with a first object, and the first object being logged in to the document application through the target application;
displaying a first authorized-document list comprising a first title in response to an authorization trigger operation on the first title in the to-be-authorized-document list, the authorization trigger operation granting the target application a permission to perform service processing on document data corresponding to the first title; and
performing, in response to an authorized-document trigger operation on the first title in the first authorized-document list, service processing on target document data by using the triggered first title as a target authorized-document title and using document data corresponding to the target authorized-document title as the target document data, and displaying a service processing result.

18. A non-transitory computer-readable storage medium, the computer-readable storage medium storing a computer program, and the computer program being adapted to be loaded and executed by a processor to perform:

displaying a document source control in a target application;

displaying an authorization scope selection list in response to a display trigger operation on the document source control, the authorization scope selection list comprising a local-scope authorization control;

displaying a to-be-authorized-document list in response to an authorization trigger operation on the local-scope authorization control, the to-be-authorized-document list comprising one or more document titles, the one or more document titles comprising a title that is in a document application and that corresponds to document data associated with a first object, and the first object being logged in to the document application through the target application;

displaying a first authorized-document list comprising a first title in response to an authorization trigger operation on the first title in the to-be-authorized-document list, the authorization trigger operation granting the target application a permission to perform service processing on document data corresponding to the first title; and performing, in response to an authorized-document trigger operation on the first title in the first authorized-document list, service processing on target document data by using the triggered first title as a target authorized-document title and using document data corresponding to the target authorized-document title as the target document data, and displaying a service processing result.

* * * * *